US009826536B2

(12) United States Patent
Wen et al.

(10) Patent No.: US 9,826,536 B2
(45) Date of Patent: Nov. 21, 2017

(54) INTERFERENCE SUPPRESSION METHOD AND RELATED DEVICE AND SYSTEM

(71) Applicant: Huawei Technologies Co., Ltd., Shenzhen, Guangdong (CN)

(72) Inventors: Ronghui Wen, Beijing (CN); Mingyu Zhou, Shenzhen (CN); Lei Wan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 14/921,228

(22) Filed: Oct. 23, 2015

(65) Prior Publication Data
US 2016/0044689 A1  Feb. 11, 2016

Related U.S. Application Data

(63) Continuation of application No. PCT/CN2013/074681, filed on Apr. 25, 2013.

(51) Int. Cl.
*H04W 4/00* (2009.01)
*H04W 72/08* (2009.01)
(Continued)

(52) U.S. Cl.
CPC ....... *H04W 72/082* (2013.01); *H04J 11/0023* (2013.01); *H04L 5/0048* (2013.01)

(58) Field of Classification Search
CPC ........... H04W 72/042; H04W 72/0413; H04W 72/0446; H04W 72/082; H04W 24/10;
(Continued)

(56) References Cited

U.S. PATENT DOCUMENTS

2011/0170435 A1* 7/2011 Kim ............ H04L 5/0023
370/252
2011/0300807 A1* 12/2011 Kwun ............ H04W 24/10
455/63.1
(Continued)

FOREIGN PATENT DOCUMENTS

CN  102892120 A  1/2013
CN  102934488 A  2/2013
(Continued)

*Primary Examiner* — Michael J Moore, Jr.

(57) ABSTRACT

Embodiments of the present invention disclose an interference suppression method and a related device and system. The method includes: sending, on a specified time-frequency resource, a first reference signal or a first reference signal group to an interfered-with end; receiving interfering source information sent by the interfered-with end, where the interfering source information includes an interference identifier used for indicating whether a potential interfering source causes interference to the interfered-with end; and if the interference identifier in the interfering source information indicates that the potential interfering source sending the reference signal on the specified time-frequency resource causes interference to the interfered-with end, determining that the potential interfering source is an interfering source, otherwise, determining that the potential interfering source is a non-interfering source. According to the present invention, mutual interference between uplink and downlink signals of terminals located in a same cell or different cells can be suppressed.

17 Claims, 8 Drawing Sheets

(51) Int. Cl.
*H04J 11/00* (2006.01)
*H04L 5/00* (2006.01)

(58) Field of Classification Search
CPC . H04W 72/0453; H04W 88/06; H04W 88/08; H04W 16/14; H04W 88/02; H04W 72/085; H04W 48/10
See application file for complete search history.

(56) References Cited

U.S. PATENT DOCUMENTS

| | | | |
|---|---|---|---|
| 2012/0015659 A1* | 1/2012 | Kalyani | H04W 72/085 455/436 |
| 2012/0040620 A1* | 2/2012 | Fu | H04B 1/1027 455/63.1 |
| 2012/0236736 A1 | 9/2012 | Frank et al. | |
| 2012/0322492 A1 | 12/2012 | Koo et al. | |
| 2012/0327800 A1* | 12/2012 | Kim | H04W 72/082 370/252 |
| 2013/0039203 A1* | 2/2013 | Fong | H04B 7/024 370/252 |
| 2013/0102304 A1* | 4/2013 | Lee | H04W 24/00 455/422.1 |
| 2013/0235743 A1* | 9/2013 | Goldhamer | H04W 24/10 370/252 |
| 2013/0244683 A1* | 9/2013 | Fukumasa | H04W 40/12 455/452.2 |
| 2013/0279362 A1 | 10/2013 | Park et al. | |
| 2014/0087747 A1* | 3/2014 | Kronestedt | H04W 72/082 455/452.1 |
| 2015/0208410 A1* | 7/2015 | Koutsimanis | H04W 24/10 370/252 |
| 2015/0358855 A1* | 12/2015 | Yang | H04B 17/345 370/252 |

FOREIGN PATENT DOCUMENTS

| | | |
|---|---|---|
| WO | WO 2012/093759 A1 | 7/2012 |
| WO | WO 2012/177092 A2 | 12/2012 |

* cited by examiner

INTERFERENCE SUPPRESSION METHOD AND RELATED DEVICE AND SYSTEM

CROSS-REFERENCE TO RELATED APPLICATIONS

This application is a continuation of International Application No. PCT/CN2013/074681, filed on Apr. 25, 2013, which is hereby incorporated by reference in its entirety.

TECHNICAL FIELD

The present invention relates to the field of communications, and in particular, to an interference suppression method, device, and system.

BACKGROUND

A long term evolution (LTE) system supports two working modes: time division duplex (TDD) and frequency division duplex (FDD). In the TDD working mode, uplink communication and downlink communication between a user terminal (UE) and a base station are performed by using different timeslots on a same frequency channel, and uplink data and downlink data are transmitted on different subframes in a same frame. In the TDD working mode, uplink data and downlink data are transmitted on symmetric frequency channels. Therefore, in the LTE system, uplink communication and downlink communication do not interfere with each other.

With the increase in the number of user terminals, demands for communication traffic keep increasing, and spectrum resources become increasingly scarce. Therefore, new technologies emerge continuously to improve utilization of existing spectrum resources. For example, in an LTE-Advanced system (an evolved LTE system), in the TDD working mode, an uplink-downlink resource configuration can be adjusted dynamically or in a semi-static manner according to demands for uplink and downlink services, that is, it is a dynamic TDD working mode. In the FDD working mode, a full-duplex technology is introduced, enabling a user terminal to send uplink data to a base station and receive downlink data from the base station by using a same frequency, so that network throughput of the LTE system is doubled without building a new base station.

The dynamic TDD working mode and the full-duplex working mode of FDD improve spectrum utilization, but also bring a new problem of interference at the same time. For example, in the dynamic TDD working mode, for two neighboring base stations, at a same moment, one may perform scheduling for a user terminal to send uplink data, and the other may perform scheduling to send downlink data to a user terminal. If two user terminals belonging to cells in which different base stations are located are both located at a border between two cells, an uplink signal of one of the user terminals causes interference to a downlink signal of the other user terminal. In the full-duplex working mode of FDD, a base station can randomly perform scheduling for two different user terminals at the same time on a same channel in a cell within coverage of the base station. If one of the user terminals sends uplink data, the other user terminal receives downlink data, and the two user terminals are near each other, the user terminal sending the uplink data causes great interference to the user terminal receiving the downlink data.

SUMMARY

Embodiments of the present invention provide an interference suppression method, device, and system, which can suppress mutual interference between uplink and downlink signals of terminals located in a same cell or different cells.

A first aspect of the present application provides an interference suppression method, including:

sending, on a specified time-frequency resource, a first reference signal or a first reference signal group to an interfered-with end;

receiving interfering source information sent by the interfered-with end, where the interfering source information includes an interference identifier used for indicating whether a potential interfering source sending a reference signal on the specified time-frequency resource causes interference to the interfered-with end, the interfering source information is generated by the interfered-with end according to signal strength of the first reference signal or the first reference signal group that is received by the interfered-with end and signal strength of a second reference signal or a second reference signal group that is sent by the potential interfering source and received on the specified time-frequency resource by the interfered-with end, the interfered-with end and the potential interfering source belong to a same cell or different cells, and the potential interfering source is an interfering source or a non-interfering source; and if the interference identifier in the interfering source information indicates that the potential interfering source sending the reference signal on the specified time-frequency resource causes interference to the interfered-with end, determining that the potential interfering source is an interfering source, or if the interference identifier in the interfering source information indicates that the potential interfering source sending the reference signal on the specified time-frequency resource does not cause interference to the interfered-with end, determining that the potential interfering source is a non-interfering source, and allocating different time-frequency resources to the interfered-with end and the potential interfering source determined as an interfering source.

In a first possible implementation manner of the first aspect of the present application, the interference suppression method may further include:

instructing the interfered-with end to measure the signal strength of the first reference signal or the first reference signal group and the signal strength of the second reference signal or the second reference signal group; and instructing the interfered-with end to send the interfering source information.

With reference to the first aspect of the present application or the first possible implementation manner of the first aspect of the present application, in a second possible implementation manner, if the interfered-with end and the interfering source belong to a same cell, before the receiving interfering source information sent by the interfered-with end, the method further includes:

instructing the potential interfering source to send, on the specified time-frequency resource, the second reference signal or the second reference signal group; and instructing the interfered-with end to receive, on the specified time-frequency resource, the second reference signal or the second reference signal group.

With reference to the first aspect of the present application or the first possible implementation manner of the first aspect of the present application, in a third possible implementation manner, if the interfered-with end and the potential interfering source belong to different cells, before the receiving interfering source information sent by the interfered-with end, the method further includes:

receiving information that is about the specified time-frequency resource and sent by a base station or a relay station to which the potential interfering source belongs; and instructing the interfered-with end to receive, on the specified time-frequency resource sent by the base station or the relay station to which the potential interfering source belongs, the second reference signal or the second reference signal group, where the second reference signal or the second reference signal group is sent by the potential interfering source after the potential interfering source receives a message that is sent by the base station or the relay station to which the potential interfering source belongs and that instructs the potential interfering source to send, on the specified time-frequency resource, the second reference signal or the second reference signal group.

With reference to the third possible implementation manner of the first aspect of the present application, in a fourth possible implementation manner, the allocating different time-frequency resources to the interfered-with end and the potential interfering source determined as an interfering source includes:

allocating different time-frequency resources to the interfered-with end and the potential interfering source determined as an interfering source, or coordinating with the base station or the relay station to which the potential interfering source determined as an interfering source belongs, to allocate different time-frequency resources to the interfered-with end and the potential interfering source determined as an interfering source.

With reference to the first possible implementation manner of the first aspect of the present application, in a fifth possible implementation manner, the instructing the interfered-with end to measure the signal strength of the first reference signal or the first reference signal group and the signal strength of the second reference signal or the second reference signal group includes:

instructing the interfered-with end to measure, in each first preset period, the signal strength of the first reference signal or the first reference signal group and the signal strength of the second reference signal or the second reference signal group sent by the potential interfering source; or instructing the interfered-with end to measure, in each first preset period, the signal strength of the first reference signal or the first reference signal group and the signal strength of the second reference signal or the second reference signal group sent by the potential interfering source determined as an interfering source; or instructing the interfered-with end to measure, in each first preset period, the signal strength of the first reference signal or the first reference signal group and the signal strength of the second reference signal or the second reference signal group sent by the potential interfering source determined as an interfering source and measure, in each second preset period, the signal strength of the first reference signal or the first reference signal group and the signal strength of the second reference signal or the second reference signal group sent by the potential interfering source determined as a non-interfering source, where the second preset period is greater than the first preset period.

With reference to the first possible implementation manner of the first aspect of the present application, in a sixth possible implementation manner, the instructing the interfered-with end to measure the signal strength of the first reference signal or the first reference signal group and the signal strength of the second reference signal or the second reference signal group includes:

when it is determined that a data transmission error rate of the interfered-with end exceeds a first preset threshold or channel quality reported by the interfered-with end stays lower than a second preset threshold, instructing the interfered-with end to measure the signal strength of the first reference signal or the first reference signal group and the signal strength of the second reference signal or the second reference signal group sent by the potential interfering source; or when it is determined that a data transmission error rate of the interfered-with end exceeds a first preset threshold or channel quality reported by the interfered-with end stays lower than a second preset threshold, instructing the interfered-with end to measure the signal strength of the first reference signal or the first reference signal group and the signal strength of the second reference signal or the second reference signal group sent by the potential interfering source determined as an interfering source.

With reference to the first possible implementation manner of the first aspect of the present application, in a seventh possible implementation manner, the instructing the interfered-with end to send the interfering source information includes:

instructing, by using independent signaling, the interfered-with end to send the interfering source information; or at the same time of instructing the interfered-with end to measure the signal strength of the first reference signal or the first reference signal group and the signal strength of the second reference signal or the second reference signal group, instructing the interfered-with end to send, after a preset time period after the signal strength of the first reference signal or the first reference signal group and the signal strength of the second reference signal or the second reference signal group are measured, the interfering source information, and instructing the interfered-with end to send a time-frequency resource occupied by the interfering source information and a transmission format.

A second aspect of the present application provides an interference suppression method, including:

receiving a first reference signal or a first reference signal group that is sent on a specified time-frequency resource by a base station or a relay station to which an interfered-with end belongs;

receiving a second reference signal or a second reference signal group that is sent on the specified time-frequency resource by a potential interfering source, where the potential interfering source and the interfered-with end belong to a same cell or different cells, and the potential interfering source is an interfering source or a non-interfering source;

generating interfering source information according to signal strength of the first reference signal or the first reference signal group and signal strength of the second reference signal or the second reference signal group, where the interfering source information includes an interference identifier used for indicating whether the potential interfering source sending a reference signal on the specified time-frequency resource causes interference to the interfered-with end, where the second reference signal or the second reference signal group is an uplink reference signal; and sending the interfering source information to the base station or the relay station to which the interfered-with end belongs, and using the interfering source information as reference information when the base station or the relay station to which the interfered-with end belongs schedules a time-frequency resource.

In a first possible implementation manner of the second aspect of the present application, before the receiving a second reference signal or a second reference signal group that is sent on the specified time-frequency resource by a potential interfering source, the method further includes:

receiving a message that is sent by the base station or the relay station to which the interfered-with end belongs and is for receiving, on the specified time-frequency resource, the second reference signal or the second reference signal group, and triggering performing of the step of receiving a second reference signal or a second reference signal group that is sent on the specified time-frequency resource by a potential interfering source.

With reference to the second aspect of the present application or the first possible implementation manner of the second aspect of the present application, in a second possible implementation manner, the generating interfering source information according to signal strength of the first reference signal or the first reference signal group and signal strength of the second reference signal or the second reference signal group includes:

calculating a difference or a ratio between the signal strength of the first reference signal or the first reference signal group and the signal strength of the second reference signal or the second reference signal group; and if the difference or the ratio is greater than a corresponding interference threshold, generating the interfering source information comprising the interference identifier used for indicating whether the potential interfering source sending the reference signal on the specified time-frequency resource causes interference to the interfered-with end, and setting the interference identifier corresponding to the specified time-frequency resource to a state of indicating that the specified time-frequency resource causes interference to the interfered-with end.

With reference to the second possible implementation manner of the second aspect of the present application, in a third possible implementation manner, the interference threshold is preset and stored in the interfered-with end or is periodically sent to the interfered-with end by means of broadcasting or signaling by the base station or the relay station to which the interfered-with end belongs, where interference thresholds of different interfered-with ends at a same moment are a same value or different values, and interference thresholds of a same interfered-with end at different moments are a same value or different values.

A third aspect of the present application provides an interference suppression device, including:

a sending module, configured to send, on a specified time-frequency resource, a first reference signal or a first reference signal group to an interfered-with end;

a receiving module, configured to receive interfering source information sent by the interfered-with end, where the interfering source information includes an interference identifier used for indicating whether a potential interfering source sending a reference signal on the specified time-frequency resource causes interference to the interfered-with end, the interfering source information is generated by the interfered-with end according to signal strength of the first reference signal or the first reference signal group that is received by the interfered-with end and signal strength of a second reference signal or a second reference signal group that is sent by the potential interfering source and received on the specified time-frequency resource by the interfered-with end, the interfered-with end and the potential interfering source belong to a same cell or different cells, and the potential interfering source is an interfering source or a non-interfering source; and an allocation module, configured to: when the interference identifier in the interfering source information indicates that the potential interfering source sending the reference signal on the specified time-frequency resource causes interference to the interfered-with end, determine that the potential interfering source is an interfering source, or when the interference identifier in the interfering source information indicates that the potential interfering source sending the reference signal on the specified time-frequency resource does not cause interference to the interfered-with end, determine that the potential interfering source is a non-interfering source, and allocate different time-frequency resources to the interfered-with end and the potential interfering source determined as an interfering source.

In a first possible implementation manner of the third aspect of the present application, the device further includes:

a first notification module, configured to instruct the interfered-with end to measure the signal strength of the first reference signal or the first reference signal group and the signal strength of the second reference signal or the second reference signal group; and a second notification module, configured to instruct the interfered-with end to send the interfering source information.

With reference to the third aspect of the present application or the first possible implementation manner of the third aspect of the present application, in a second possible implementation manner, if the interfered-with end and the interfering source belong to a same cell, the base station further includes:

a third notification module, configured to instruct the potential interfering source to send, on the specified time-frequency resource, the second reference signal or the second reference signal group, and instruct the interfered-with end to receive, on the specified time-frequency resource, the second reference signal or the second reference signal group.

With reference to the third aspect of the present application or the first possible implementation manner of the third aspect of the present application, in a third possible implementation manner, if the interfered-with end and the interfering source belong to different cells, the base station further includes:

a second receiving module, configured to receive information that is about the specified time-frequency resource and sent by a base station or a relay station to which the potential interfering source belongs; and a fourth notification module, configured to instruct the interfered-with end to receive, on the specified time-frequency resource sent by the potential interfering source, the second reference signal or the second reference signal group, where the second reference signal or the second reference signal group is sent by the potential interfering source after the potential interfering source receives a message that is sent by the base station or the relay station to which the potential interfering source belongs and that instructs the potential interfering source to send, on the specified time-frequency resource, the second reference signal or the second reference signal group.

With reference to the third possible implementation manner of the third aspect of the present application, in a fourth possible implementation manner, the allocation module is specifically configured to:

allocate different time-frequency resources to the interfered-with end and the potential interfering source determined as an interfering source, or configured to coordinate with the base station or the relay station to which the potential interfering source determined as an interfering source belongs, to allocate different time-frequency resources to the interfered-with end and the potential interfering source determined as an interfering source.

With reference to the first possible implementation manner of the third aspect of the present application, in a fifth possible implementation manner, the first notification module is specifically configured to:

instruct the interfered-with end to measure, in each first preset period, the signal strength of the first reference signal or the first reference signal group and the signal strength of the second reference signal or the second reference signal group sent by the potential interfering source; or configured to instruct the interfered-with end to measure, in each first preset period, the signal strength of the first reference signal or the first reference signal group and the signal strength of the second reference signal or the second reference signal group sent by the potential interfering source determined as an interfering source; or configured to instruct the interfered-with end to measure, in each first preset period, the signal strength of the first reference signal or the first reference signal group and the signal strength of the second reference signal or the second reference signal group sent by the potential interfering source determined as an interfering source and measure, in each second preset period, the signal strength of the first reference signal or the first reference signal group and the signal strength of the second reference signal or the second reference signal group sent by the potential interfering source determined as a non-interfering source, where the second preset period is greater than the first preset period.

With reference to the first possible implementation manner of the third aspect of the present application, in a sixth possible implementation manner, the first notification module is specifically configured to:

when it is determined that a data transmission error rate of the interfered-with end exceeds a preset threshold, instruct the interfered-with end to measure the signal strength of the first reference signal or the first reference signal group and the signal strength of the second reference signal or the second reference signal group sent by the potential interfering source; or configured to: when it is determined that a data transmission error rate of the interfered-with end exceeds a preset threshold, instruct the interfered-with end to measure the signal strength of the first reference signal or the first reference signal group and the signal strength of the second reference signal or the second reference signal group sent by the potential interfering source determined as an interfering source.

With reference to the first possible implementation manner of the third aspect of the present application, in a seventh possible implementation manner, the second notification module is specifically configured to:

instruct, by using independent signaling, the interfered-with end to send the interfering source information; or configured to: at the same time of instructing the interfered-with end to measure the signal strength of the first reference signal or the first reference signal group and the signal strength of the second reference signal or the second reference signal group, instruct the interfered-with end to send, after a preset time period after the signal strength of the first reference signal or the first reference signal group and the signal strength of the second reference signal or the second reference signal group are measured, the interfering source information, and instruct the interfered-with end to send a time-frequency resource occupied by the interfering source information and a transmission format.

A fourth aspect of the present application provides an interference suppression device, including:

a receiving module, configured to receive a first reference signal or a first reference signal group that is sent on a specified time-frequency resource by a base station or a relay station to which an interfered-with end belongs, and configured to receive a second reference signal or a second reference signal group that is sent on the specified time-frequency resource by a potential interfering source, where the potential interfering source and the interfered-with end belong to a same cell or different cells, and the potential interfering source is an interfering source or a non-interfering source;

an interfering source information generation module, configured to generate interfering source information according to signal strength of the first reference signal or the first reference signal group received by the receiving module and signal strength of the second reference signal or the second reference signal group received by the receiving module, where the interfering source information includes an interference identifier used for indicating whether the potential interfering source sending a reference signal on the specified time-frequency resource causes interference to the interfered-with end; and a sending module, configured to send the interfering source information generated by the interfering source information generation module to the base station or the relay station to which the interfered-with end belongs, so that the base station or the relay station to which the interfered-with end belongs determines that the potential interfering source is an interfering source when the interference identifier in the interfering source information indicates that the potential interfering source sending the reference signal on the specified time-frequency resource causes interference to the interfered-with end, or determines that the potential interfering source is a non-interfering source when the interference identifier in the interfering source information indicates that the potential interfering source sending the reference signal on the specified time-frequency resource does not cause interference to the interfered-with end, and allocates different time-frequency resources to the interfered-with end and the potential interfering source determined as an interfering source.

In a first possible implementation manner of the fourth aspect of the present application, the device further includes a second receiving module, configured to:

receive a message that is sent by the base station or the relay station to which the interfered-with end belongs and is for receiving, on the specified time-frequency resource, the second reference signal or the second reference signal group, and trigger the receiving module to perform the step of receiving a second reference signal or a second reference signal group that is sent on the specified time-frequency resource by a potential interfering source.

With reference to the fourth aspect of the present application or the first possible implementation manner of the fourth aspect, in a second possible implementation manner, the interfering source information generation module is specifically configured to:

calculate a difference or a ratio between the signal strength of the first reference signal or the first reference signal group and the signal strength of the second reference signal or the second reference signal group; and when the difference or the ratio is greater than a corresponding interference threshold, generate the interfering source information comprising the interference identifier used for indicating whether the potential interfering source sending the reference signal on the specified time-frequency resource causes interference to the interfered-with end, and set the interference identifier corresponding to the specified time-frequency resource to a state of indicating that the specified time-frequency resource causes interference to the interfered-with end.

A fifth aspect of the present application provides an interference suppression device, including a memory and a processor, where a set of program code is stored in the memory, and the processor is configured to invoke the program code stored in the memory, to perform the following operations:

sending, on a specified time-frequency resource, a first reference signal or a first reference signal group to an interfered-with end;

receiving interfering source information sent by the interfered-with end, where the interfering source information includes an interference identifier used for indicating whether a potential interfering source sending a reference signal on the specified time-frequency resource causes interference to the interfered-with end, the interfering source information is generated by the interfered-with end according to signal strength of the first reference signal or the first reference signal group that is received by the interfered-with end and signal strength of a second reference signal or a second reference signal group that is sent by the potential interfering source and received on the specified time-frequency resource by the interfered-with end, the interfered-with end and the potential interfering source belong to a same cell or different cells, and the potential interfering source is an interfering source or a non-interfering source; and when the interference identifier in the interfering source information indicates that the potential interfering source sending the reference signal on the specified time-frequency resource causes interference to the interfered-with end, determining that the potential interfering source is an interfering source, or when the interference identifier in the interfering source information indicates that the potential interfering source sending the reference signal on the specified time-frequency resource does not cause interference to the interfered-with end, determining that the potential interfering source is a non-interfering source, and allocating different time-frequency resources to the interfered-with end and the potential interfering source determined as an interfering source.

In a first possible implementation manner of the fifth aspect of the present application, the processor is further configured to perform steps of:

instructing the interfered-with end to measure the signal strength of the first reference signal or the first reference signal group and the signal strength of the second reference signal or the second reference signal group; and instructing the interfered-with end to send the interfering source information.

With reference to the fifth aspect of the present application or the first possible implementation manner of the fifth aspect of the present application, in a second possible implementation manner, if the interfered-with end and the interfering source belong to a same cell, before the processor performs the step of receiving interfering source information sent by the interfered-with end, the processor is further configured to perform steps of:

instructing the potential interfering source to send, on the specified time-frequency resource, the second reference signal or the second reference signal group; and instructing the interfered-with end to receive, on the specified time-frequency resource, the second reference signal or the second reference signal group.

With reference to the fifth aspect of the present application or the first possible implementation manner of the fifth aspect of the present application, in a third possible implementation manner, if the interfered-with end and the potential interfering source belong to different cells, before the processor performs the step of receiving interfering source information sent by the interfered-with end, the processor is further configured to perform steps of:

receiving information that is about the specified time-frequency resource and sent by a base station or a relay station to which the potential interfering source belongs; and instructing the interfered-with end to receive, on the specified time-frequency resource sent by the base station or the relay station to which the potential interfering source belongs, the second reference signal or the second reference signal group, where the second reference signal or the second reference signal group is sent by the potential interfering source after the potential interfering source receives a message that is sent by the base station or the relay station to which the potential interfering source belongs and that instructs the potential interfering source to send, on the specified time-frequency resource, the second reference signal or the second reference signal group.

With reference to the third possible implementation manner of the fifth aspect of the present application, in a fourth possible implementation manner, a specific manner in which the processor performs the step of allocating different time-frequency resources to the interfered-with end and the potential interfering source determined as an interfering source includes:

allocating different time-frequency resources to the interfered-with end and the potential interfering source determined as an interfering source, or coordinating with the base station or the relay station to which the potential interfering source determined as an interfering source belongs, to allocate different time-frequency resources to the interfered-with end and the potential interfering source determined as an interfering source.

With reference to the first possible implementation manner of the fifth aspect of the present application, in a fifth possible implementation manner, a specific manner in which the processor performs the step of instructing the interfered-with end to measure the signal strength of the first reference signal or the first reference signal group and the signal strength of the second reference signal or the second reference signal group includes:

instructing the interfered-with end to measure, in each first preset period, the signal strength of the first reference signal or the first reference signal group and the signal strength of the second reference signal or the second reference signal group sent by the potential interfering source; or instructing the interfered-with end to measure, in each first preset period, the signal strength of the first reference signal or the first reference signal group and the signal strength of the second reference signal or the second reference signal group sent by the potential interfering source determined as an interfering source; or instructing the interfered-with end to measure, in each first preset period, the signal strength of the first reference signal or the first reference signal group and the signal strength of the second reference signal or the second reference signal group sent by the potential interfering source determined as an interfering source and measure, in each second preset period, the signal strength of the first reference signal or the first reference signal group and the signal strength of the second reference signal or the second reference signal group sent by the potential interfering source determined as a non-interfering source, where the second preset period is greater than the first preset period.

With reference to the first possible implementation manner of the fifth aspect of the present application, in a sixth possible implementation manner, a specific manner in which the processor performs the step of instructing the interfered-with end to measure the signal strength of the first reference signal or the first reference signal group and the signal strength of the second reference signal or the second reference signal group includes:

when it is determined that a data transmission error rate of the interfered-with end exceeds a preset threshold, instructing the interfered-with end to measure the signal strength of the first reference signal or the first reference signal group and the signal strength of the second reference signal or the second reference signal group sent by the potential interfering source; or when it is determined that a data transmission error rate of the interfered-with end exceeds a preset threshold, instructing the interfered-with end to measure the signal strength of the first reference signal or the first reference signal group and the signal strength of the second reference signal or the second reference signal group sent by the potential interfering source determined as an interfering source.

With reference to the first possible implementation manner of the fifth aspect of the present application, in a seventh possible implementation manner, a specific manner in which the processor performs the step of instructing the interfered-with end to send the interfering source information includes:

instructing, by using independent signaling, the interfered-with end to send the interfering source information; or at the same time of instructing the interfered-with end to measure the signal strength of the first reference signal or the first reference signal group and the signal strength of the second reference signal or the second reference signal group, instructing the interfered-with end to send, after a preset time period after the signal strength of the first reference signal or the first reference signal group and the signal strength of the second reference signal or the second reference signal group are measured, the interfering source information, and instructing the interfered-with end to send a time-frequency resource occupied by the interfering source information and a transmission format.

A sixth aspect of the present application provides an interference suppression device, including a memory and a processor, where a set of program code is stored in the memory, and the processor is configured to invoke the program code stored in the memory, to perform the following operations:

receiving a first reference signal or a first reference signal group that is sent on a specified time-frequency resource by a base station or a relay station to which an interfered-with end belongs;

receiving a second reference signal or a second reference signal group that is sent on the specified time-frequency resource by a potential interfering source, where the potential interfering source and the interfered-with end belong to a same cell or different cells, and the potential interfering source is an interfering source or a non-interfering source;

generating interfering source information according to signal strength of the first reference signal or the first reference signal group and signal strength of the second reference signal or the second reference signal group, where the interfering source information includes an interference identifier used for indicating whether the potential interfering source sending a reference signal on the specified time-frequency resource causes interference to the interfered-with end; and sending the interfering source information to the base station or the relay station to which the interfered-with end belongs, and using the interfering source information as reference information when the base station or the relay station to which the interfered-with end belongs schedules a time-frequency resource.

In a first possible implementation manner of the sixth aspect of the present application, before the processor performs the step of receiving a second reference signal or a second reference signal group that is sent on the specified time-frequency resource by a potential interfering source, the processor is further configured to perform steps of:

receiving a message that is sent by the base station or the relay station to which the interfered-with end belongs and is for receiving, on the specified time-frequency resource, the second reference signal or the second reference signal group, and triggering performing of the step of receiving a second reference signal or a second reference signal group that is sent on the specified time-frequency resource by a potential interfering source.

With reference to the sixth aspect of the present application or the first possible implementation manner of the sixth aspect, in a second possible implementation manner, a specific manner in which the processor performs the step of generating interfering source information according to signal strength of the first reference signal or the first reference signal group and signal strength of the second reference signal or the second reference signal group includes:

calculating a difference or a ratio between the signal strength of the first reference signal or the first reference signal group and the signal strength of the second reference signal or the second reference signal group; and when the difference or the ratio is greater than a corresponding interference threshold, generating the interfering source information comprising the interference identifier used for indicating whether the potential interfering source sending the reference signal on the specified time-frequency resource causes interference to the interfered-with end, and setting the interference identifier corresponding to the specified time-frequency resource to a state of indicating that the specified time-frequency resource causes interference to the interfered-with end.

With reference to the second possible implementation manner of the sixth aspect of the present application, in a third possible implementation manner, the interference threshold is preset and stored in the interfered-with end or is periodically sent to the interfered-with end by means of broadcasting or signaling by the base station or the relay station to which the interfered-with end belongs.

A seventh aspect of the present application provides an interference suppression system, including a first interference suppression device, a potential interfering source, and a second interference suppression device, where the potential interfering source and the second interference suppression device belong to a same cell or different cells;

the first interference suppression device is configured to send, on a specified time-frequency resource, a first reference signal or a first reference signal group to the second interference suppression device;

the potential interfering source is configured to send, on the specified time-frequency resource, a second reference signal or a second reference signal group;

the second interference suppression device is configured to generate interfering source information according to signal strength of the first reference signal or the first reference signal group and signal strength of the second reference signal or the second reference signal group, and send the interfering source information to the first base station, where the interfering source information includes an interference identifier used for indicating whether the potential interfering source sending a reference signal on the specified time-frequency resource causes interference to the second interference suppression device; and the first interference suppression device is configured to: when the interference identifier in the interfering source information indicates that the potential interfering source sending the reference signal on the specified time-frequency resource causes interference to the second interference suppression device, determine that the potential interfering source is an interfering source, or when the interference identifier in the interfering source information indicates that the potential interfering source sending the reference signal on the specified time-frequency resource does not cause interference to the second interference suppression device, determine that the potential interfering source is a non-interfering source, and allocate different time-frequency resources to the second interference suppression device and the potential interfering source determined as an interfering source.

In a first possible implementation manner of the seventh aspect, the first interference suppression device is further configured to:

instruct the second interference suppression device to measure the signal strength of the first reference signal or the first reference signal group and the signal strength of the second reference signal or the second reference signal group.

With reference to the seventh aspect of the present application or the first possible implementation manner of the seventh aspect, in a second possible implementation manner, if the second interference suppression device and the potential interfering source belong to a same cell, the first interference suppression device is further configured to:

instruct the potential interfering source to send, on the specified time-frequency resource, the second reference signal or the second reference signal group; and instruct the second interference suppression device to receive, on the specified time-frequency resource, the second reference signal or the second reference signal group.

With reference to the seventh aspect of the present application or the first possible implementation manner of the seventh aspect, in a third possible implementation manner, if the interfered-with end and the interfering source belong to different cells, the system further includes a third interference suppression device, configured to:

instruct the potential interfering source to send, on the specified time-frequency resource, the second reference signal or the second reference signal group; and send information about the specified time-frequency resource to the first interference suppression device.

With reference to the third possible implementation manner of the seventh aspect of the present application, in a fourth possible implementation manner, the first interference suppression device is further configured to:

receive the information that is about the specified time-frequency resource and sent by the third interference suppression device; and instruct the second interference suppression device to receive, on the specified time-frequency resource sent by the third interference suppression device, the second reference signal or the second reference signal group.

According to the present invention, an interfered-with end receives a first reference signal or a first reference signal group and a second reference signal or a second reference signal group, which are respectively sent, on a specified time-frequency resource, by a base station or a relay station and an interfering source, determines whether the specified time-frequency resource causes interference to the interfered-with end by comparing signal strength of the first reference signal or the first reference signal group with strength of the second reference signal or the second reference signal group, and if the specified time-frequency resource causes interference to the interfered-with end, instructs the base station or the relay station to which the interfered-with end belongs to coordinate during scheduling, so as to avoid arranging uplink and downlink signals of the interfered-with end and the interfering source on a same time-frequency resource for communication. The present invention can suppress mutual interference between uplink and downlink signals of terminals located in a same cell or different cells.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 2:
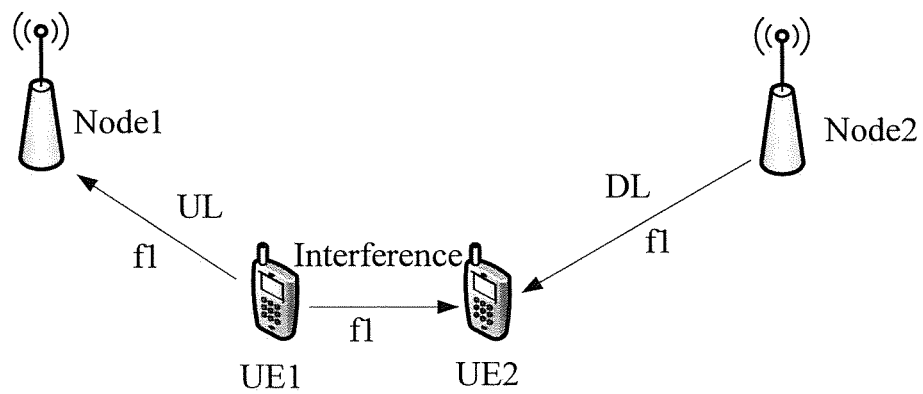
FIG. 2 is a schematic diagram of mutual interference between uplink and downlink signals of user terminals in a full-duplex working mode of FDD.

In a dynamic TDD working mode, for two neighboring base stations, at a same moment, one may perform scheduling for a user terminal to send uplink data, and the other may perform scheduling to send downlink data to a user terminal. If two user terminals belonging to different base stations are both located at a border between two cells, an uplink signal of one of the user terminals causes interference to a downlink signal of the other user terminal. For a user terminal or a relay station that is located at a cell border and in a first cell, a potential interfering source that may cause interference to the user terminal or the relay station is a user terminal or a relay station that is located at the border of the first cell and in a neighboring cell. For example, as shown in FIG. 2, Node1 and Node2 are neighboring cells, and UE1 and UE2 are respectively user terminals in cells Node1 and Node2. At a same moment, uplinks and downlinks of the neighboring cells may be not unified: At the same moment, Node1 performs scheduling for UE1 to send an uplink (UL) signal and Node2 performs scheduling to send a downlink (DL) signal to UE2. If the two user terminals UE1 and UE2 belonging to different cells are both located at a border between the two cells, an uplink of UE1 may cause great interference to a downlink of UE2, and as shown in FIG. 2, interference power of UE1 may be even higher than power received by UE2 from the serving cell Node2 of UE2. Node1 and Node2 may be, but are not limited to, a macro site, a micro site, a pico site, or the like. The neighboring cells may be two cells having different coverage areas, or may be two different types of cells whose coverage areas overlap. For example, Node1 is a Marco site, and Node2 is a Pico site.

Figure 1:
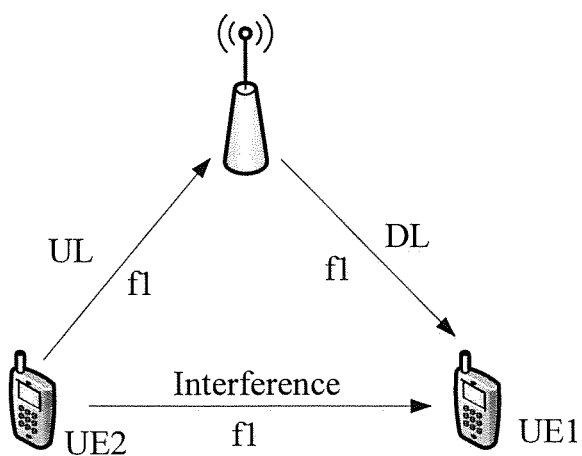
FIG. 1 is a schematic diagram of mutual interference between uplink and downlink signals of user terminals in a dynamic TDD working mode.

In a full-duplex working mode of FDD, a base station can randomly perform scheduling for two different user terminals at the same time on a same channel in a cell within coverage of the base station. If one of the user terminals sends uplink data, the other user terminal receives downlink data, and the two user terminals are near each other, the user terminal sending the uplink data causes interference to the user terminal receiving the downlink data. For a user terminal or a relay station in a cell, a potential interfering source that may cause interference to the user terminal or the relay station is another user terminal or relay station in the cell. For example, as shown in FIG. 1, in the full-duplex working mode of FDD, user terminals UE1 and UE2 can receive and send signals on a same time-frequency resource. That is, a full-duplex base station randomly schedules a same resource for UE1 and UE2 at the same time within a coverage area of the full-duplex base station, and the two user terminals are near each other; therefore, a user sending an uplink signal causes great interference to a user receiving a downlink signal. For example, in FIG. 1, a base station Node1 schedules a resource f1 to send downlink information to UE1, and at the same time, schedules the resource f1 for UE2 to send uplink information to the base station. Therefore, the uplink information of UE2 may affect demodulation of the downlink information by UE1.

In the prior art, in order to measure downlink signal quality, in an LTE system, at full bandwidth, a base station always sends a downlink reference signal (RS) such as a cell-specific reference signal (CRS), or periodically sends a synchronization pilot and channel state information-reference signal (CSI RS) to a user terminal. The user terminal measures, by receiving the downlink RS or the CSI RS, strength and quality of a downlink signal of a serving cell to which the user terminal belongs or a neighboring cell. The base station may perform user zone identification, neighboring cell determining, scheduling, and the like according to a measurement result reported by the user terminal. In order to measure uplink signal quality, in the LTE system, a base station instructs a user terminal to periodically send, on a specific time-frequency resource, an uplink RS signal such as a sounding reference signal (SRS). The base station evaluates channel quality of an uplink signal by measuring the SRS signal, or the base station performs, by using a demodulation reference signal (DMRS), channel estimation before signal demodulation.

Figure 3:
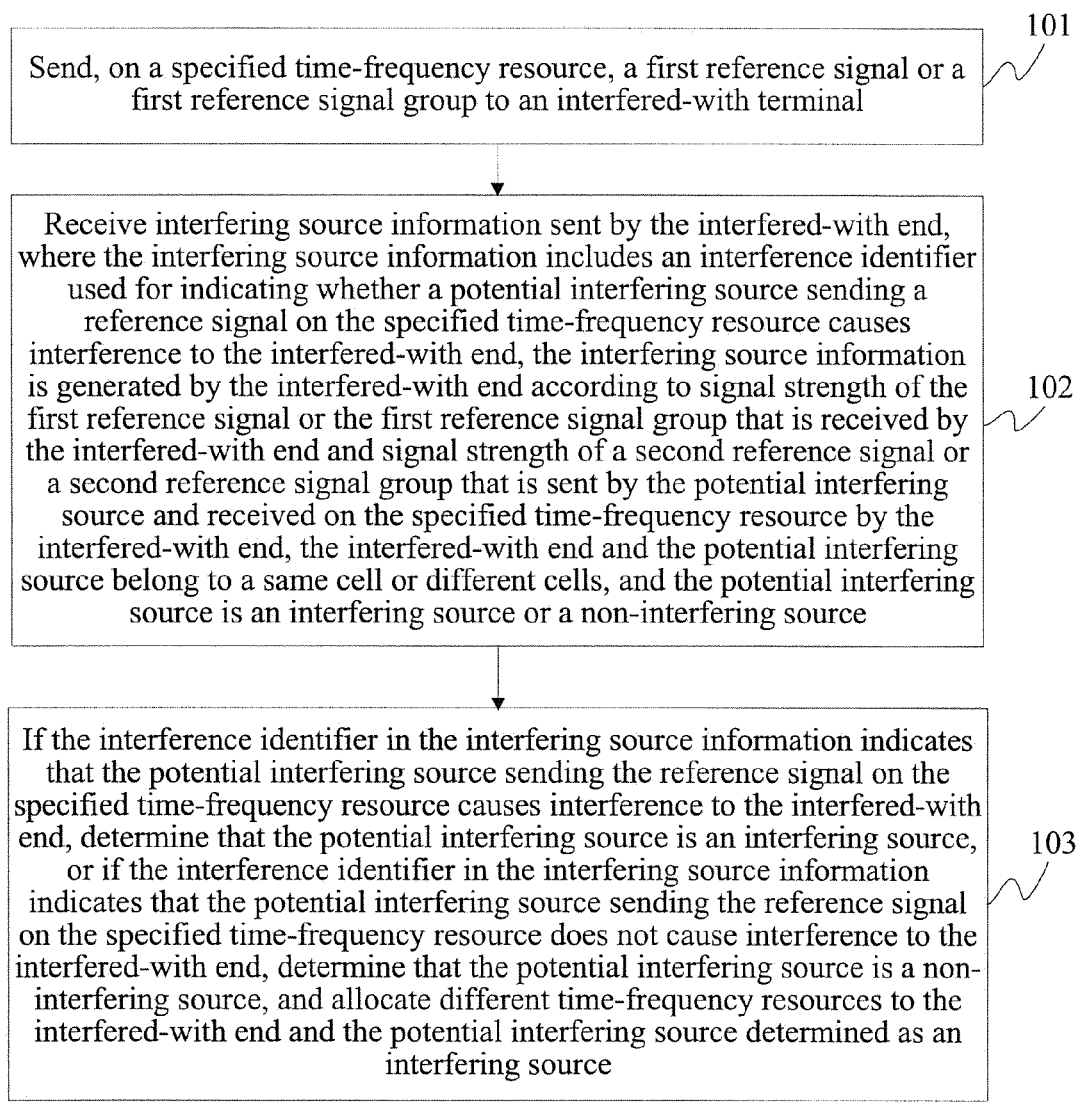
FIG. 3 is a flowchart of an interference suppression method according to an embodiment of the present invention.

Referring to FIG. 3, FIG. 3 is a flowchart of an interference suppression method according to an embodiment of the present invention. An execution body of this embodiment is a base station or a relay station to which an interfered-with end belongs, the interfered-with end in this embodiment is a user terminal or a relay station, and a potential interfering source is a user terminal that is located at a cell border and in a neighboring cell of a cell to which the interfered-with end belongs or another user terminal or relay station in a cell to which the interfered-with end belongs. The interference suppression method provided in this embodiment includes:

101: Send, on a specified time-frequency resource, a first reference signal or a first reference signal group to an interfered-with terminal.

Optionally, the first reference signal or the first reference signal group may be a synchronization pilot, a cell specific RS, or a UE specific RS. For ease of description, an example in which the first reference signal or the first reference signal group is a cell specific RS signal is used for description in this embodiment, but a person skilled in the art can understand that the first reference signal or the first reference signal group is not limited to a cell specific RS.

102: Receive interfering source information sent by the interfered-with end, where the interfering source information includes an interference identifier used for indicating whether a potential interfering source sending a reference signal on the specified time-frequency resource causes interference to the interfered-with end, the interfering source information is generated by the interfered-with end according to signal strength of the first reference signal or the first reference signal group that is received by the interfered-with end and signal strength of a second reference signal or a second reference signal group that is sent by the potential interfering source and received on the specified time-frequency resource by the interfered-with end, the interfered-with end and the potential interfering source belong to a same cell or different cells, and the potential interfering source is an interfering source or a non-interfering source.

Optionally, the second reference signal or the second reference signal group sent on the specified time-frequency resource by the interfering source may be an SRS signal or a demodulation reference signal. For ease of description, an example in which the second reference signal or the second reference signal group is an SRS signal is used for description in this embodiment, but a person skilled in the art can understand that the second reference signal or the second reference signal group is not limited to an SRS signal.

103: If the interference identifier in the interfering source information indicates that the potential interfering source sending the reference signal on the specified time-frequency resource causes interference to the interfered-with end, determine that the potential interfering source is an interfering source, or if the interference identifier in the interfering source information indicates that the potential interfering source sending the reference signal on the specified time-frequency resource does not cause interference to the interfered-with end, determine that the potential interfering source is a non-interfering source, and allocate different time-frequency resources to the interfered-with end and the potential interfering source determined as an interfering source.

Optionally, the method in this embodiment further includes: instructing the interfered-with end to measure the signal strength of the first reference signal or the first reference signal group and the signal strength of the second reference signal or the second reference signal group; and instructing the interfered-with end to send the interfering source information to a base station or a relay station to which the interfered-with end belongs.

A manner for instructing the interfered-with end to measure the signal strength of the first reference signal or the first reference signal group and the signal strength of the second reference signal or the second reference signal group may be:

instructing the interfered-with end to measure, in each first preset period, the signal strength of the first reference signal or the first reference signal group and the signal strength of the second reference signal or the second reference signal group sent by the potential interfering source; or instructing the interfered-with end to measure, in each first preset period, the signal strength of the first reference signal or the first reference signal group and the signal strength of the second reference signal or the second reference signal group sent by the potential interfering source determined as an interfering source; or instructing the interfered-with end to measure, in each first preset period, the signal strength of the first reference signal or the first reference signal group and the signal strength of the second reference signal or the second reference signal group sent by the potential interfering source determined as an interfering source and measure, in each second preset period, the signal strength of the first reference signal or the first reference signal group and the signal strength of the second reference signal or the second reference signal group sent by the potential interfering source determined as a non-interfering source, where the second preset period is greater than the first preset period.

The first preset period and the second preset period may be in milliseconds. The base station or the relay station may instruct the interfered-with end to periodically measure, at relatively short intervals, strength of reference signals of all potential interfering ends; or instruct the interfered-with end to periodically measure, at relatively short intervals, strength of a reference signal only of a potential interfering source determined as an interfering source; or instruct the interfered-with end to periodically measure, at relatively short intervals, strength of a reference signal of a potential interfering source determined as an interfering source and periodically measure, at relatively long intervals, strength of a reference signal of a potential interfering source determined as a non-interfering source.

Another manner for instructing the interfered-with end to measure the signal strength of the first reference signal or the first reference signal group and the signal strength of the second reference signal or the second reference signal group may be:

when it is determined that a data transmission error rate of the interfered-with end exceeds a first preset threshold or channel quality reported by the interfered-with end stays lower than a second preset threshold, instructing the interfered-with end to measure the signal strength of the first reference signal or the first reference signal group and the signal strength of the second reference signal or the second reference signal group sent by the potential interfering source; or when it is determined that a data transmission error rate of the interfered-with end exceeds a first preset threshold or channel quality reported by the interfered-with end stays lower than a second preset threshold, instructing the interfered-with end to measure the signal strength of the first reference signal or the first reference signal group and the signal strength of the second reference signal or the second reference signal group sent by the potential interfering source determined as an interfering source.

The execution body may determine the data transmission error rate of the interfered-with end according to a quantity of times that the execution body receives a negative acknowledgement (NACK) returned by the interfered-with end. When the quantity of times that the NACK is received exceeds the first preset threshold, it indicates that the interfered-with end currently has a relatively high transmission error rate and is subject to relatively severe interference. By instructing the interfered-with end to measure a reference signal and report interfering source information, the execution body schedules a time-frequency resource according to the interfering source information, so as to perform interference suppression. The first threshold herein may be set according to engineering experience during specific implementation. A specific implementation manner in which the execution body determines that channel quality reported by the interfered-with end stays lower than the preset threshold may be: when channel quality received several successive times is lower than the second preset threshold, instructing the interfered-with end to measure a reference signal. A quantity of successive times and the second preset threshold herein may also be set according to engineering experience during specific implementation.

Optionally, a specific manner in which the execution body instructs the interfered-with end to send the interfering source information may be:

instructing, by using independent signaling, the interfered-with end to send the interfering source information; or at the same time of instructing the interfered-with end to measure the signal strength of the first reference signal or the first reference signal group and the signal strength of the second reference signal or the second reference signal group, instructing the interfered-with end to send, after a preset time period after the signal strength of the first reference signal or the first reference signal group and the signal strength of the second reference signal or the second reference signal group are measured, the interfering source information, and instructing the interfered-with end to send a time-frequency resource occupied by the interfering source information and a transmission format.

Optionally, in a first possible implementation manner, if the interfered-with end and the interfering source belong to a same cell, before the receiving interfering source information sent by the interfered-with end, the interference suppression method provided in this embodiment may further include:

instructing the potential interfering source to send, on the specified time-frequency resource, the second reference signal or the second reference signal group; and instructing the interfered-with end to receive, on the specified time-frequency resource, the second reference signal or the second reference signal group.

In the first possible implementation manner, the interfering source may be a user terminal or a relay station in a cell to which the interfered-with end belongs. The execution body arranges several user terminals or relay stations as interfering sources to simultaneously send SRS signals and arranges one user terminal as an interfered-with end to measure the SRS signals sent by the other user terminals.

When instructing the other user terminals or relay stations to send the SRSs on a specified frequency band, the execution body instructs the interfered-with end to receive and measure signal strength of these SRS signals. The user terminals or the relay stations may send the SRS signals on a same time-frequency resource or different time-frequency resources. If the potential interfering sources send the SRSs on different time-frequency resources or the interfered-with end does not know a time-frequency resource occupied when an interfering source sends an SRS, the execution body needs to send a message to the interfered-with end, to instruct the interfered-with end to receive, on the specified time-frequency resource, the second reference signal or the second reference signal group.

A method in which the interfered-with end generates the interfering source information according to the signal strength of the first reference signal or the first reference signal group received by the interfered-with end and the signal strength of the second reference signal or the second reference signal group sent on the specified time-frequency resource by the interfering source may be that:

the interfered-with end measures the signal strength, which is represented by $P\_ue$, of the SRS that is sent on the specified time-frequency resource by the potential interfering source;

at the same time or at a previous moment, the interfered-with end measures the strength, which is represented by $P\_enb$, of the cell specific RS sent by the execution body; and the interfered-with end calculates a ratio or a difference between $P\_ue$ and $P\_enb$, and compares a calculation result with a preset interference threshold, to determine whether a signal of a user causes interference to communication of the interfered-with end. The preset interference threshold may be preset and stored in the interfered-with end or may be periodically sent to the interfered-with end by means of broadcasting or signaling by the base station or the relay station to which the interfered-with end belongs. The preset interference threshold is set according to whether a selected algorithm is ratio calculation or difference calculation. Interference thresholds of different interfered-with ends at a same moment may be different, and interference thresholds of a same interfered-with end at different moments may also be different.

The calculation result of the foregoing calculation is used for generating the interfering source information. A format of the interfering source information may include a time-frequency resource section and a corresponding interference identifier, and the interference identifier may be represented by a bit; for example, each time-frequency resource section corresponds to an interference identifier of 1 bit, the interference identifier "0" indicates that no interference is caused to the interfered-with end, and "1" indicates that interference is caused to the interfered-with end.

For a system in which structures of an uplink signal and a downlink signal are the same, when instructing the interfered-with end to measure the first reference signal or reference signal group and the second reference signal or the second reference signal group, the execution body only needs to notify the interfered-with end of a time-frequency position for measurement, and does not need to notify the interfered-with end whether an uplink signal or a downlink signal is to be measured.

When measuring, according to an instruction of the base station, SRSs sent by interfering sources, the interfered-with end does not need to know on which time-frequency resource each specific interfering source sends an SRS signal, the interfered-with end sends generated interfering source information to the base station, and the base station can automatically determine a corresponding specific interfering source according to a time-frequency resource section.

Figure 4:
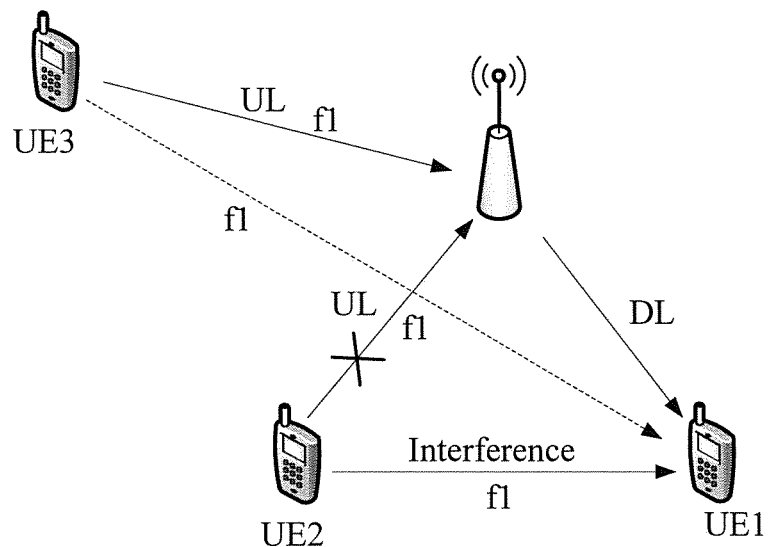
FIG. 4 is a schematic diagram of time-frequency resource scheduling that is for interference suppression and is performed by a base station when an interfered-with end and an interfering source in the embodiment in FIG. 3 belong to a same cell.

As shown in FIG. 4, FIG. 4 is a schematic diagram of time-frequency resource scheduling that is for interference suppression and is performed by a base station or a relay station when an interfered-with end and an interfering source belong to a same cell. For ease of description, a base station is used as an example for description. As shown in FIG. 4, UE1 is an interfered-with end, and for UE1, an uplink signal of UE2 may severely affect reception of a downlink signal by UE1, and strength of interference generated by an uplink signal of UE3 may be far less than that of UE2. A base station instructs UE2 and UE3 to send SRS signals on a specified time-frequency resource; after calculation, UE1 reports generated interfering source information to the base station; and the base station views interference identifiers corresponding to time-frequency resource sections, for example, an interference identifier of a time-frequency resource corresponding to UE2 is "1", and an interference identifier of a time-frequency resource corresponding to UE3 is "0". After receiving the interfering source information, the base station can determine that the uplink signal of UE2 is downlink interference to UE1, and during subsequent scheduling, the base station avoids arranging uplink and downlink signals of UE1 and UE2 on a same time-frequency resource for scheduling, that is, allocates different time-frequency resources to UE1 and UE2 but can arrange UE3 and UE1 on a same time-frequency resource for scheduling.

Optionally, in a second possible implementation manner, if the interfered-with end and the interfering source belong to different cells, before the receiving interfering source information sent by the interfered-with end, the interference suppression method provided in this embodiment may further include:

receiving information that is about the specified time-frequency resource and sent by a base station or a relay station to which the potential interfering source belongs; and instructing the interfered-with end to receive, on the specified time-frequency resource sent by the base station or the relay station to which the potential interfering source belongs, the second reference signal or the second reference signal group, where the second reference signal or the second reference signal group is sent by the potential interfering source after the potential interfering source receives a message that is sent by the base station or the relay station to which the potential interfering source belongs and that instructs the potential interfering source to send, on the specified time-frequency resource, the second reference signal or the second reference signal group.

The second possible implementation manner is usually applied to a dynamic TDD scenario, in which the potential interfering source is located in a first cell and belongs to a base station or a relay station Node1 in the first cell, the interfered-with end is located in a second cell and belongs to a base station or a relay station Node2 in the second cell, and the potential interfering source and the interfered-with end are both located at a border between the two cells. In the second possible implementation manner, the base station or the relay station that is in the second cell and that the interfered-with end belongs to also arranges that the interfered-with end measures the strength of the reference signal of the potential interfering source and the strength of the reference signal sent by the base station or the relay station to which the interfered-with end belongs, so as to determine whether the interfered-with end is subject to interference from the potential interfering source, but in the second possible implementation manner, the base stations or relay stations Node1 and Node2 to which the interfered-with end and the potential interfering source belong need to exchange SRS information, which is specifically as follows:

Node1 acquires a possible interfering cell or interfered-with cell (the cell in which Node2 is located) according to CRS signal receive power (Cell-specific reference signal Receive Power, CRSRP) that is of a serving cell and an interfering cell and is reported by a potential interfering source, for example, UE1, and sends information, such as a transmit frequency band and a sequence number, about a specified time-frequency resource to Node2 before instructing UE to send an SRS signal.

Node2 instructs a user terminal or a relay station that is in a local cell and previously reports that Node1 is a neighboring cell, that is, an interfered-with end (for example, UE2), to receive, on the specified time-frequency resource, the SRS signal that is sent by UE1, and UE2 measures signal strength P_ue of the SRS sent on the specified time-frequency resource.

Node2 sends a CRS or CSI RS signal to UE2 on the specified time-frequency resource, and UE2 measures signal strength P_enb of the CRS or CSI RS signal.

The interfered-with end UE2 calculates a ratio or a difference between P_ue and P_enb, and compares a calculation result with a preset threshold, to determine whether a signal of a user causes interference to communication of the interfered-with end. The preset threshold may be preset on a user side, or may also be periodically set by the base station according to a communication capability of a user. The preset threshold is set according to whether a selected algorithm is ratio calculation or difference calculation.

The calculation result of the foregoing calculation is used for generating the interfering source information. A format of the interfering source information may include a time-frequency resource section and a corresponding interference identifier, and the interference identifier may be represented by a bit; for example, each time-frequency resource section corresponds to an interference identifier of 1 bit, the interference identifier "0" indicates that no interference is caused to the interfered-with end, and "1" indicates that interference is caused to the interfered-with end.

When measuring, according to an instruction of the base station, SRSs sent by potential interfering sources, the interfered-with end does not need to know on which time-frequency resource each specific potential interfering source sends an SRS signal, the interfered-with end sends generated interfering source information to the base station, and the base station can automatically determine a corresponding specific potential interfering source according to a time-frequency resource section.

In the second possible implementation manner, Node2 allocates a new time-frequency resource different from the specified time-frequency resource to the interfered-with end or the interfering source according to the interfering source information reported by the interfered-with end UE2, and a specific implementation manner may be:

allocating different time-frequency resources to the interfered-with end and the potential interfering source determined as an interfering source, or coordinating with the base station or the relay station to which the potential interfering source determined as an interfering source belongs, to allocate different time-frequency resources to the interfered-with end and the potential interfering source determined as an interfering source.

Figure 5:
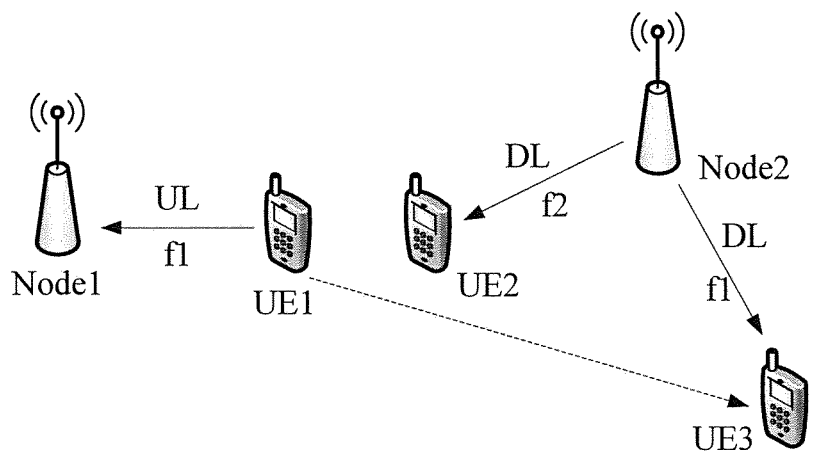
FIG. 5 is a schematic diagram of time-frequency resource scheduling that is for interference suppression and is performed by a base station when an interfered-with end and an interfering source in the embodiment in FIG. 3 belong to different cells.

Using an embodiment in FIG. 5 as an example, a manner in which the execution body coordinates with the base station or the relay station to which the potential interfering source determined as an interfering source belongs to allocate different time-frequency resources to the interfered-with end and the potential interfering source determined as an interfering source may be that: before scheduling UE1 or UE2, Node1 and Node2 advise each other to schedule the same time-frequency resource for another non-interfering user. For example, when an uplink resource f1 is scheduled for UE1, UE3 may be arranged on the resource f1 for downlink scheduling, and UE2 is arranged on another resource f2 for downlink scheduling.

Besides, Node1 may arrange that multiple users which are served by Node1 and which report that a neighboring cell is Node2 to simultaneously send SRS signals on different frequency bands, so that a user of Node2 conveniently measures the SRS signals simultaneously and perform reporting, thereby improving efficiency.

Besides, when Node1 instructs UE1 to send an SRS signal, Node2 may also arrange that multiple users served by Node2 to simultaneously measure the SRS signal and report interference status of the users.

Figure 6:
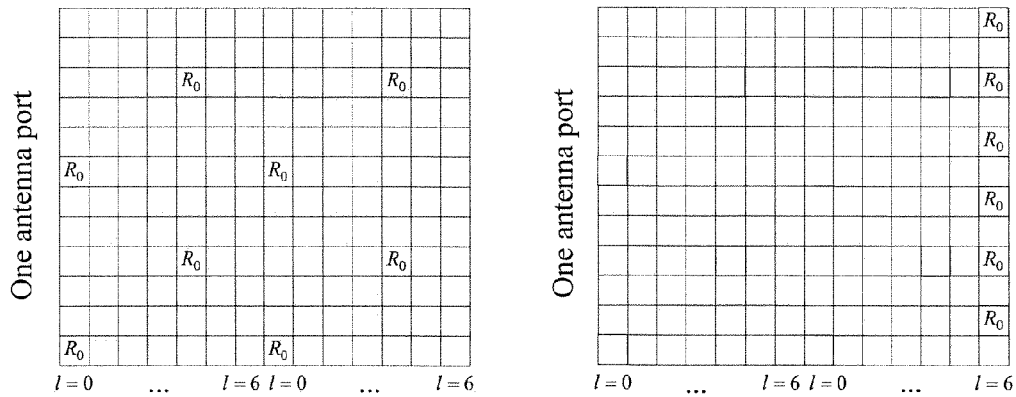
FIG. 6 is a spectrum diagram of positions of downlink CRS and uplink SRS signals in a time-frequency resource.

At present, positions of resource elements (RE) that are in a time-frequency resource and occupied by uplink and downlink RS signals are different, as shown in FIG. 6, which is a spectrum diagram of positions of downlink CRS (the diagram on the left) and uplink SRS (the diagram on the right) signals in a time-frequency resource. The horizontal axis is a timeslot number, and each square along the vertical axis is a carrier. In the case of an uplink-downlink symmetric structure, a case in which transmit sources corresponding to uplink and downlink RS signals are respectively a base station and an interfering source has the following benefits:

(1) An interfered-with end only needs to be notified of time-frequency resources whose RSRPs are to be measured, and does not need to be notified whether an uplink RS signal or a downlink RS signal is to be measured.

(2) When measuring RSRPs of a base station and a possible interfering source, the interfered-with end measures signal energy on a same RE, and compared with an uplink-downlink asymmetric structure, the measurement is more accurate.

In this embodiment, according to interfering source information measured and reported by an interfered-with end, a base station or a relay station to which the interfered-with end belongs avoids, during resource scheduling, allocating a same time-frequency resource to the interfered-with end and an interfering source that interfere with each other, thereby achieving an objective of interference suppression. According to this embodiment, mutual interference between uplink and downlink signals of terminals located in a same cell or different cells can be suppressed.

Figure 7:
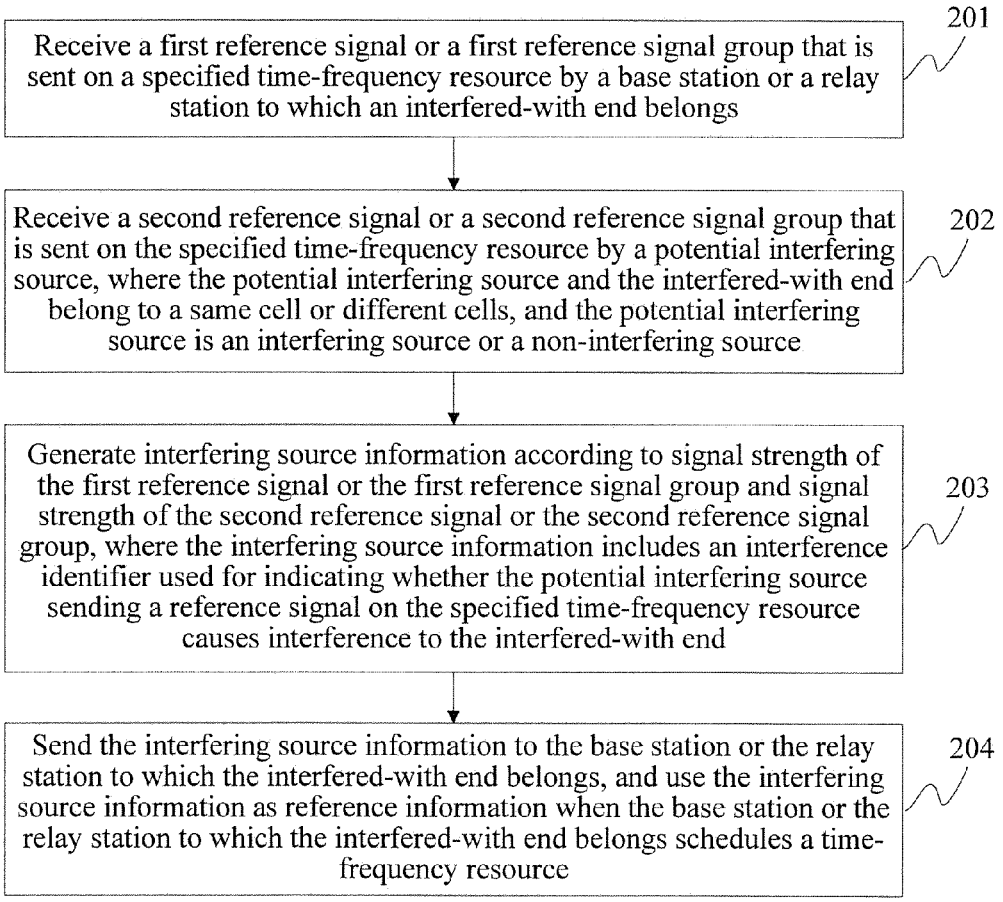
FIG. 7 is a flowchart of an interference suppression method according to an embodiment of the present invention.

Referring to FIG. 7, FIG. 7 is a flowchart of an interference suppression method according to an embodiment of the present invention. This embodiment is executed by an interfered-with end. The interference suppression method provided in this embodiment includes:

201: Receive a first reference signal or a first reference signal group that is sent on a specified time-frequency resource by a base station or a relay station to which an interfered-with end belongs.

Optionally, the first reference signal or the first reference signal group is a CRS or a CSI RS or a synchronization signal.

202: Receive a second reference signal or a second reference signal group that is sent on the specified time-frequency resource by a potential interfering source, where the potential interfering source and the interfered-with end belong to a same cell or different cells, and the potential interfering source is an interfering source or a non-interfering source.

Optionally, the second reference signal or the second reference signal group sent on the specified time-frequency resource by the interfering source is an SRS signal or a demodulation reference signal.

203: Generate interfering source information according to signal strength of the first reference signal or the first reference signal group and signal strength of the second reference signal or the second reference signal group, where the interfering source information includes an interference identifier used for indicating whether the potential interfering source sending a reference signal on the specified time-frequency resource causes interference to the interfered-with end, where the second reference signal or the second reference signal group is an uplink reference signal.

Optionally, a specific method for calculating the interfering source information according to the signal strength of the first reference signal or the first reference signal group and the signal strength of the second reference signal or the second reference signal group may be:

calculating a difference or a ratio between the signal strength of the first reference signal or the first reference signal group and the signal strength of the second reference signal or the second reference signal group; and if the difference or the ratio is greater than a corresponding interference threshold, generating the interfering source information including the interference identifier used for indicating whether the potential interfering source sending the reference signal on the specified time-frequency resource causes interference to the interfered-with end, and setting the interference identifier corresponding to the specified time-frequency resource to a state of indicating that the specified time-frequency resource causes interference to the interfered-with end.

A specific calculation method may be that:

the interfered-with end measures the signal strength, which is represented by $P\_ue$, of the SRS that is sent on the specified time-frequency resource by the potential interfering source;

at the same time or at a previous moment, the interfered-with end measures the strength, which is represented by $P\_enb$, of the cell specific RS sent by the base station or the relay station; and the interfered-with end calculates a ratio or a difference between $P\_ue$ and $P\_enb$, and compares a calculation result with a preset interference threshold, to determine whether a signal of a user causes interference to communication of the interfered-with end. The preset interference threshold may be preset and stored in the interfered-with end or may be periodically sent to the interfered-with end by means of broadcasting or signaling by the base station or the relay station to which the interfered-with end belongs. The preset interference threshold is set according to whether a selected algorithm is ratio calculation or difference calculation. Interference thresholds of different interfered-with ends at a same moment may be different, and interference thresholds of a same interfered-with end at different moments may also be different.

The calculation result of the foregoing calculation is used for generating the interfering source information. A format of the interfering source information may include a time-frequency resource section and a corresponding interference identifier, and the interference identifier may be represented by a bit; for example, each time-frequency resource section corresponds to an interference identifier of 1 bit, the interference identifier "0" indicates that no interference is caused to the interfered-with end, and "1" indicates that interference is caused to the interfered-with end.

204: Send the interfering source information to the base station or the relay station to which the interfered-with end belongs, and use the interfering source information as reference information when the base station or the relay station to which the interfered-with end belongs schedules a time-frequency resource.

The using the interfering source information as reference information when the base station or the relay station to which the interfered-with end belongs schedules a time-frequency resource is specifically: when the interference identifier in the interfering source information indicates that the potential interfering source sending the reference signal on the specified time-frequency resource causes interference to the interfered-with end, determining, by the base station or the relay station to which the interfered-with end belongs, that the potential interfering source is an interfering source; or when the interference identifier in the interfering source information indicates that the potential interfering source sending the reference signal on the specified time-frequency resource does not cause interference to the interfered-with end, determining that the potential interfering source is a non-interfering source, and allocating different time-frequency resources to the interfered-with end and the potential interfering source determined as an interfering source.

Optionally, before the receiving a second reference signal or a second reference signal group that is sent on the specified time-frequency resource by a potential interfering source, the interference suppression method provided in this embodiment may further include:

receiving a message that is sent by the base station or the relay station to which the interfered-with end belongs and is for receiving, on the specified time-frequency resource, the second reference signal or the second reference signal group, and triggering performing of the step of receiving a second reference signal or a second reference signal group that is sent on the specified time-frequency resource by a potential interfering source.

In this embodiment, an interfered-with end receives a first reference signal or a first reference signal group and a second reference signal or a second reference signal group, which are respectively sent, on a specified time-frequency resource, by a base station and a potential interfering source, determines whether the specified time-frequency resource causes interference to the interfered-with end by comparing signal strength of the first reference signal or the first reference signal group with strength of the second reference signal or the second reference signal group, and if the specified time-frequency resource causes interference to the interfered-with end, instructs the base station or a relay station to which the interfered-with end belongs to coordinate during scheduling, so as to avoid arranging uplink and downlink signals of the interfered-with end and the interfering source on a same time-frequency resource for communication. According to the present invention, mutual interference between uplink and downlink signals of terminals located in a same cell or different cells can be suppressed.

Figure 8:
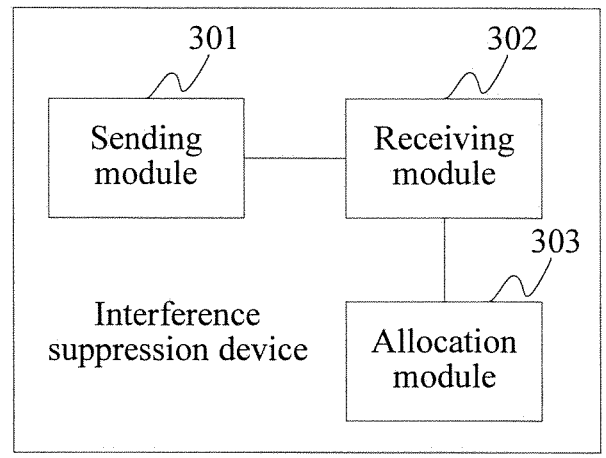
FIG. 8 is a structural diagram of an interference suppression device according to an embodiment of the present invention.

Referring to FIG. 8, FIG. 8 is a structural diagram of an interference suppression device according to an embodiment of the present invention. The interference suppression device may be a base station or a relay station. As shown in FIG. 8, the interference suppression device includes:

a sending module 301, configured to send, on a specified time-frequency resource, a first reference signal or a first reference signal group to an interfered-with end;

a receiving module 302, configured to receive interfering source information sent by the interfered-with end, where the interfering source information includes an interference identifier used for indicating whether a potential interfering source sending a reference signal on the specified time-frequency resource causes interference to the interfered-with end, the interfering source information is generated by the interfered-with end according to signal strength of the first reference signal or the first reference signal group that is received by the interfered-with end and signal strength of a second reference signal or a second reference signal group that is sent by the potential interfering source and received on the specified time-frequency resource by the interfered-with end, the interfered-with end and the potential interfering source belong to a same cell or different cells, and the potential interfering source is an interfering source or a non-interfering source; and an allocation module 303, configured to: when the interference identifier in the interfering source information indicates that the potential interfering source sending the reference signal on the specified time-frequency resource causes interference to the interfered-with end, determine that the potential interfering source is an interfering source, or when the interference identifier in the interfering source information indicates that the potential interfering source sending the reference signal on the specified time-frequency resource does not cause interference to the interfered-with end, determine that the potential interfering source is a non-interfering source, and allocate different time-frequency resources to the interfered-with end and the potential interfering source determined as an interfering source.

Figure 9:
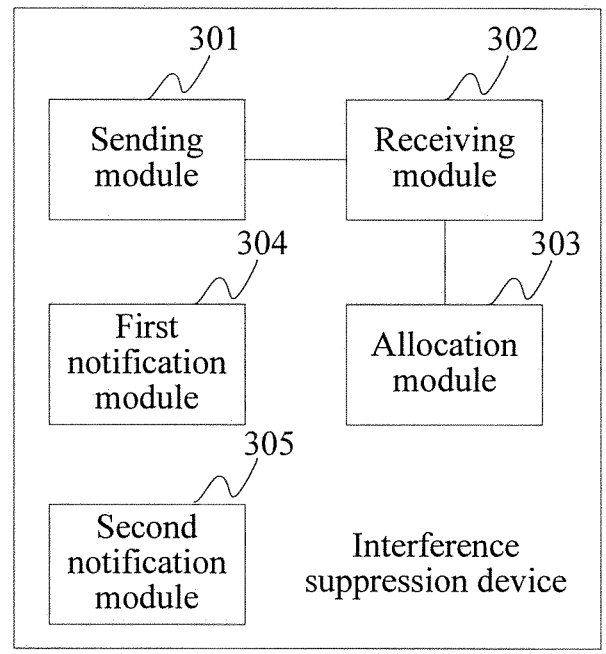
FIG. 9 is a structural diagram of another interference suppression device according to an embodiment of the present invention.

Optionally, as shown in FIG. 9, the interference suppression device provided in this embodiment may further include a first notification module 304 and a second notification module 305, where the first notification module 304 is configured to instruct the interfered-with end to measure the signal strength of the first reference signal or the first reference signal group and the signal strength of the second reference signal or the second reference signal group; and the second notification module 305 is configured to instruct the interfered-with end to send the interfering source information.

Figure 10:
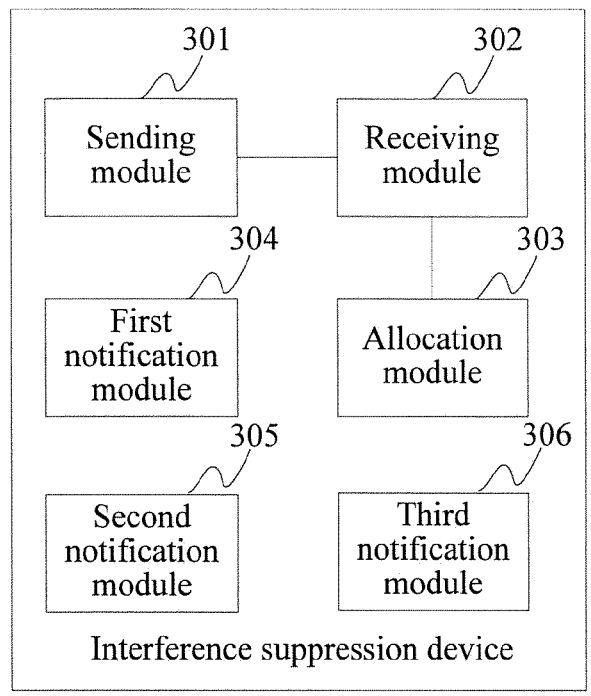
FIG. 10 is a structural diagram of still another interference suppression device according to an embodiment of the present invention.

Optionally, as shown in FIG. 10, in a first possible implementation manner, if the interfered-with end and the interfering source belong to a same cell, the interference suppression base station provided in this embodiment may further include:

a third notification module 306, configured to instruct the potential interfering source to send, on the specified time-frequency resource, the second reference signal or the second reference signal group, and instruct the interfered-with end to receive, on the specified time-frequency resource, the second reference signal or the second reference signal group.

Figure 11:
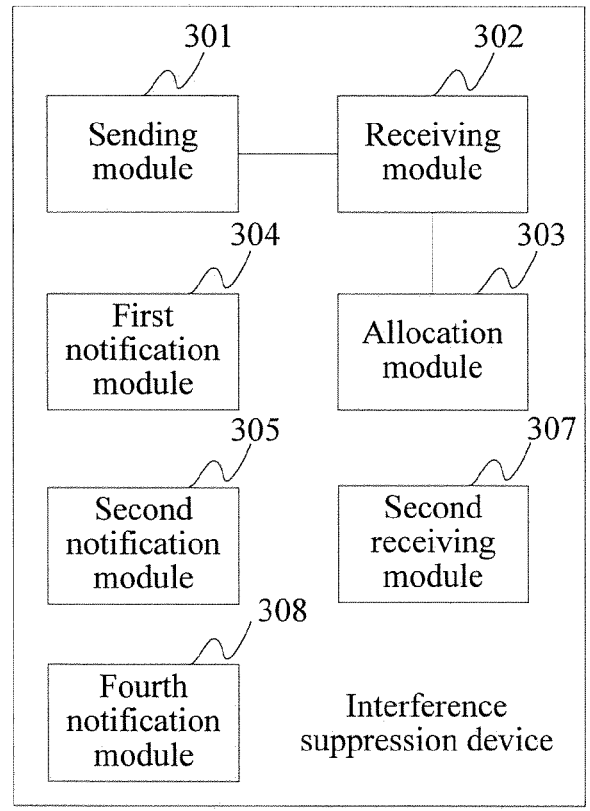
FIG. 11 is a structural diagram of yet another interference suppression device according to an embodiment of the present invention.

Optionally, as shown in FIG. 11, in a second possible implementation manner, if the interfered-with end and the interfering source belong to different cells, the interference suppression base station provided in this embodiment may further include:

a second receiving module 307, configured to receive information that is about the specified time-frequency resource and sent by a base station or a relay station to which the potential interfering source belongs; and a fourth notification module 308, configured to instruct the interfered-with end to receive, on the specified time-frequency resource sent by the potential interfering source, the second reference signal or the second reference signal group, where the second reference signal or the second reference signal group is sent by the potential interfering source after the potential interfering source receives a message that is sent by the base station or the relay station to which the potential interfering source belongs and that instructs the potential interfering source to send, on the specified time-frequency resource, the second reference signal or the second reference signal group.

Optionally, the allocation module 303 is specifically configured to:

allocate different time-frequency resources to the interfered-with end and the potential interfering source determined as an interfering source, or configured to coordinate with the base station or the relay station to which the potential interfering source determined as an interfering source belongs, to allocate different time-frequency resources to the interfered-with end and the potential interfering source determined as an interfering source.

A specific implementation manner for coordinating with the base station or the relay station to which the potential interfering source determined as an interfering source belongs to allocate different time-frequency resources to the interfered-with end and the potential interfering source determined as an interfering source may be: using an embodiment in FIG. 5 as an example, a manner in which the interference suppression device coordinates with the base station or the relay station to which the potential interfering source determined as an interfering source belongs to allocate different time-frequency resources to the interfered-with end and the potential interfering source determined as an interfering source may be that before scheduling UE1 or UE2, Node1 and Node2 advise each other to schedule the same time-frequency resource for another non-interfering user. For example, when an uplink resource f1 is scheduled for UE1, UE3 may be arranged on the resource f1 for downlink scheduling, and UE2 is arranged on another resource f2 for downlink scheduling.

In this embodiment, according to interfering source information measured and reported by an interfered-with end, an interference suppression base station avoids, during resource scheduling, allocating a same time-frequency resource to the interfered-with end and an interfering source that interfere with each other, thereby achieving an objective of interference suppression. According to this embodiment, mutual interference between uplink and downlink signals of terminals located in a same cell or different cells can be suppressed.

Figure 12:
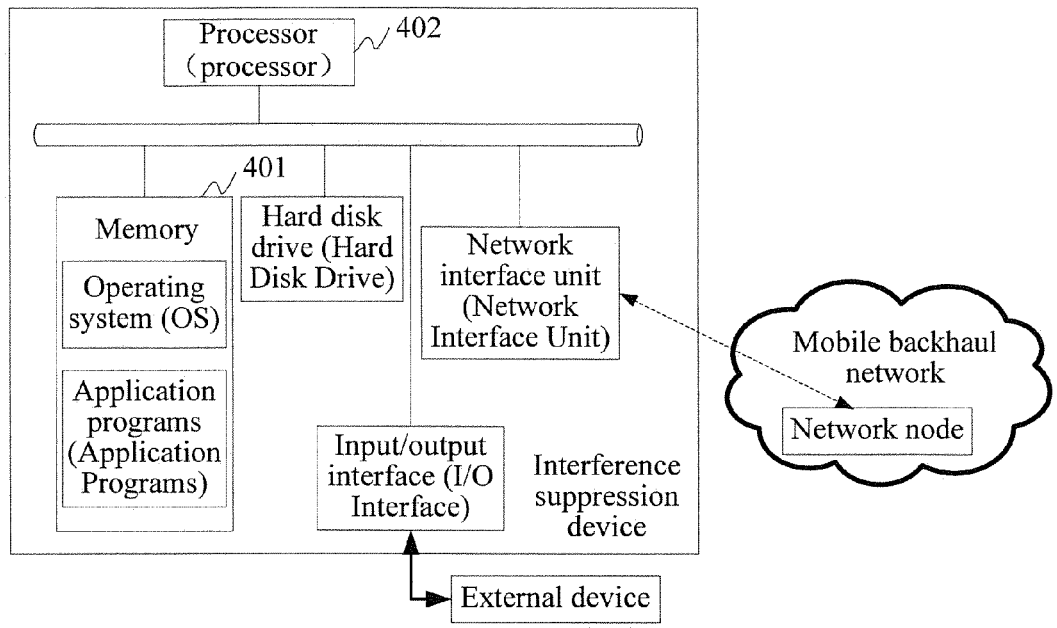
FIG. 12 is a structural diagram of an interference suppression device according to an embodiment of the present invention.

Referring to FIG. 12, FIG. 12 is a structural diagram of an interference suppression device according to an embodiment of the present invention. The interference suppression device includes a memory 401 and a processor 402, where a set of program code is stored in the memory 401, and the processor 402 is configured to invoke the program code stored in the memory 401, to perform the following operations:

sending, on a specified time-frequency resource, a first reference signal or a first reference signal group to an interfered-with end;

receiving interfering source information sent by the interfered-with end, where the interfering source information includes an interference identifier used for indicating whether a potential interfering source sending a reference signal on the specified time-frequency resource causes interference to the interfered-with end, the interfering source information is generated by the interfered-with end according to signal strength of the first reference signal or the first reference signal group that is received by the interfered-with end and signal strength of a second reference signal or a second reference signal group that is sent by the potential interfering source and received on the specified time-frequency resource by the interfered-with end, the interfered-with end and the potential interfering source belong to a same cell or different cells, and the potential interfering source is an interfering source or a non-interfering source; and when the interference identifier in the interfering source information indicates that the potential interfering source sending the reference signal on the specified time-frequency resource causes interference to the interfered-with end, determining that the potential interfering source is an interfering source, or when the interference identifier in the interfering source information indicates that the potential interfering source sending the reference signal on the specified time-frequency resource does not cause interference to the interfered-with end, determining that the potential interfering source is a non-interfering source, and allocating different time-frequency resources to the interfered-with end and the potential interfering source determined as an interfering source.

Optionally, the processor 402 is further configured to perform steps of:

instructing the interfered-with end to measure the signal strength of the first reference signal or the first reference signal group and the signal strength of the second reference signal or the second reference signal group; and instructing the interfered-with end to send the interfering source information.

Optionally, if the interfered-with end and the interfering source belong to a same cell, before the processor 402 performs the step of receiving interfering source information sent by the interfered-with end, the processor 402 is further configured to perform steps of:

instructing the potential interfering source to send, on the specified time-frequency resource, the second reference signal or the second reference signal group; and instructing the interfered-with end to receive, on the specified time-frequency resource, the second reference signal or the second reference signal group.

Optionally, if the interfered-with end and the potential interfering source belong to different cells, before the processor 402 performs the step of receiving interfering source information sent by the interfered-with end, the processor 402 is further configured to perform steps of:

receiving information that is about the specified time-frequency resource and sent by a base station or a relay station to which the potential interfering source belongs; and instructing the interfered-with end to receive, on the specified time-frequency resource sent by the base station or the relay station to which the potential interfering source belongs, the second reference signal or the second reference signal group, where the second reference signal or the second reference signal group is sent by the potential interfering source after the potential interfering source receives a message that is sent by the base station or the relay station to which the potential interfering source belongs and that instructs the potential interfering source to send, on the specified time-frequency resource, the second reference signal or the second reference signal group.

Optionally, a specific manner in which the processor 402 performs the step of allocating different time-frequency resources to the interfered-with end and the potential interfering source determined as an interfering source includes:

allocating different time-frequency resources to the interfered-with end and the potential interfering source determined as an interfering source, or coordinating with the base station or the relay station to which the potential interfering source determined as an interfering source belongs, to allocate different time-frequency resources to the interfered-with end and the potential interfering source determined as an interfering source.

A specific implementation manner for coordinating with the base station or the relay station to which the potential interfering source determined as an interfering source belongs to allocate different time-frequency resources to the interfered-with end and the potential interfering source determined as an interfering source may be: using an embodiment in FIG. 5 as an example, a manner in which the interference suppression device coordinates with the base station or the relay station to which the potential interfering source determined as an interfering source belongs to allocate different time-frequency resources to the interfered-with end and the potential interfering source determined as an interfering source may be that before scheduling UE1 or UE2, Node1 and Node2 advise each other to schedule the same time-frequency resource for another non-interfering user. For example, when an uplink resource f1 is scheduled for UE1, UE3 may be arranged on the resource f1 for downlink scheduling, and UE2 is arranged on another resource f2 for downlink scheduling.

Optionally, a specific manner in which the processor 402 performs the step of instructing the interfered-with end to measure the signal strength of the first reference signal or the first reference signal group and the signal strength of the second reference signal or the second reference signal group includes:

instructing the interfered-with end to measure, in each first preset period, the signal strength of the first reference signal or the first reference signal group and the signal strength of the second reference signal or the second reference signal group sent by the potential interfering source; or instructing the interfered-with end to measure, in each first preset period, the signal strength of the first reference signal or the first reference signal group and the signal strength of the second reference signal or the second reference signal group sent by the potential interfering source determined as an interfering source; or instructing the interfered-with end to measure, in each first preset period, the signal strength of the first reference signal or the first reference signal group and the signal strength of the second reference signal or the second reference signal group sent by the potential interfering source determined as an interfering source and measure, in each second preset period, the signal strength of the first reference signal or the first reference signal group and the signal strength of the second reference signal or the second reference signal group sent by the potential interfering source determined as a non-interfering source, where the second preset period is greater than the first preset period.

Optionally, a specific manner in which the processor 402 performs the step of instructing the interfered-with end to measure the signal strength of the first reference signal or the first reference signal group and the signal strength of the second reference signal or the second reference signal group includes:

when it is determined that a data transmission error rate of the interfered-with end exceeds a preset threshold, instructing the interfered-with end to measure the signal strength of the first reference signal or the first reference signal group and the signal strength of the second reference signal or the second reference signal group sent by the potential interfering source; or when it is determined that a data transmission error rate of the interfered-with end exceeds a preset threshold, instructing the interfered-with end to measure the signal strength of the first reference signal or the first reference signal group and the signal strength of the second reference signal or the second reference signal group sent by the potential interfering source determined as an interfering source.

Optionally, a specific manner in which the processor 402 performs the step of instructing the interfered-with end to send the interfering source information includes:

instructing, by using independent signaling, the interfered-with end to send the interfering source information; or at the same time of instructing the interfered-with end to measure the signal strength of the first reference signal or the first reference signal group and the signal strength of the second reference signal or the second reference signal group, instructing the interfered-with end to send, after a preset time period after the signal strength of the first reference signal or the first reference signal group and the signal strength of the second reference signal or the second reference signal group are measured, the interfering source information, and instructing the interfered-with end to send a time-frequency resource occupied by the interfering source information and a transmission format.

In this embodiment, according to interfering source information measured and reported by an interfered-with end, an interference suppression base station avoids, during resource scheduling, allocating a same time-frequency resource to the interfered-with end and an interfering source that interfere with each other, thereby achieving an objective of interference suppression. According to this embodiment, mutual interference between uplink and downlink signals of terminals located in a same cell or different cells can be suppressed.

Figure 13:
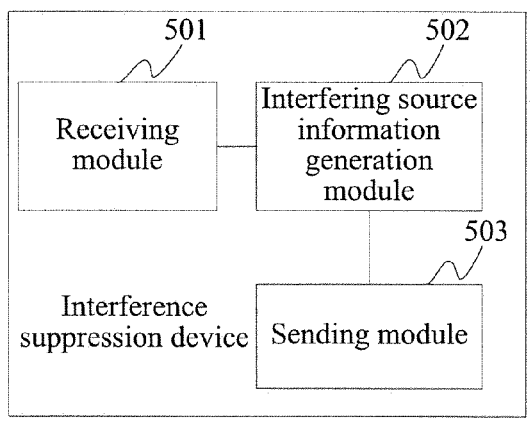
FIG. 13 is a structural diagram of an interference suppression device according to an embodiment of the present invention.

Referring to FIG. 13, FIG. 13 is a structural diagram of an interference suppression device according to an embodiment of the present invention. The interference suppression device provided in this embodiment is an interfered-with end, that is, a user terminal or a relay station. In this embodiment, the interference suppression device is referred to as an interfered-with end, and a potential interfering source is a user terminal that is located at a cell border and in a neighboring cell of a cell to which the interfered-with end belongs or another user terminal or relay station in a cell to which the interfered-with end belongs. As shown in FIG. 13, the interference suppression device provided in this embodiment includes:

a receiving module 501, configured to receive a first reference signal or a first reference signal group that is sent on a specified time-frequency resource by a base station or a relay station to which an interfered-with end belongs, and configured to receive a second reference signal or a second reference signal group that is sent on the specified time-frequency resource by a potential interfering source, where the potential interfering source and the interfered-with end belong to a same cell or different cells, and the potential interfering source is an interfering source or a non-interfering source;

an interfering source information generation module 502, configured to generate interfering source information according to signal strength of the first reference signal or the first reference signal group received by the receiving module 501 and signal strength of the second reference signal or the second reference signal group received by the receiving module 501, where the interfering source information includes an interference identifier used for indicating whether the potential interfering source sending a reference signal on the specified time-frequency resource causes interference to the interfered-with end, where the second reference signal or the second reference signal group is an uplink reference signal; and a sending module 503, configured to send the interfering source information generated by the interfering source information generation module 502 to the base station or the relay station to which the interfered-with end belongs, and use the interfering source information as reference information when the base station or the relay station to which the interfered-with end belongs schedules a time-frequency resource.

The using the interfering source information as reference information when the base station or the relay station to which the interfered-with end belongs schedules a time-frequency resource may be: when the interference identifier in the interfering source information indicates that the potential interfering source sending the reference signal on the specified time-frequency resource causes interference to the interfered-with end, determining, by the base station or the relay station to which the interfered-with end belongs, that the potential interfering source is an interfering source, or when the interference identifier in the interfering source information indicates that the potential interfering source sending the reference signal on the specified time-frequency resource does not cause interference to the interfered-with end, determining that the potential interfering source is a non-interfering source, and allocating different time-frequency resources to the interfered-with end and the potential interfering source determined as an interfering source.

Figure 14:
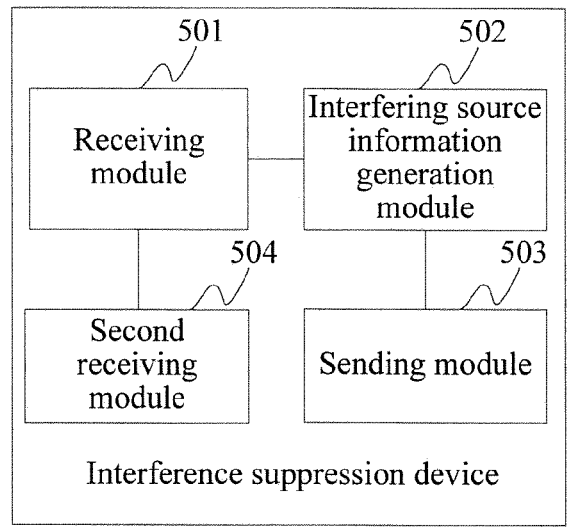
FIG. 14 is a structural diagram of another interference suppression device according to an embodiment of the present invention.

Optionally, as shown in FIG. 14, the interference suppression device provided in this embodiment may further include a second receiving module 504, configured to:

receive a message that is sent by the base station or the relay station to which the interfered-with end belongs and is for receiving, on the specified time-frequency resource, the second reference signal or the second reference signal group, and trigger the receiving module 501 to perform the step of receiving a second reference signal or a second reference signal group that is sent on the specified time-frequency resource by a potential interfering source.

Optionally, the interfering source information generation module 502 is specifically configured to:

calculate a difference or a ratio between the signal strength of the first reference signal or the first reference signal group and the signal strength of the second reference signal or the second reference signal group; and when the difference or the ratio is greater than a corresponding interference threshold, generate the interfering source information including the interference identifier used for indicating whether the potential interfering source sending the reference signal on the specified time-frequency resource causes interference to the interfered-with end, and set the interference identifier corresponding to the specified time-frequency resource to a state of indicating that the specified time-frequency resource causes interference to the interfered-with end.

The preset interference threshold may be preset and stored in the interfered-with end or may be periodically sent to the interfered-with end by means of broadcasting or signaling by the base station or the relay station to which the interfered-with end belongs. The preset interference threshold is set according to whether a selected algorithm is ratio calculation or difference calculation. Interference thresholds of different interfered-with ends at a same moment may be different, and interference thresholds of a same interfered-with end at different moments may also be different.

A specific calculation method may be that:

the interfered-with end measures the signal strength, which is represented by P_ue, of the SRS that is sent on the specified time-frequency resource by the potential interfering source;

at the same time or at a previous moment, the interfered-with end measures the strength, which is represented by P_enb, of the cell specific RS sent by the base station or the relay station; and the interfered-with end calculates a ratio or a difference between P_ue and P_enb, and compares a calculation result with a preset interference threshold, to determine whether a signal of a user causes interference to communication of the interfered-with end. The preset interference threshold may be preset and stored in the interfered-with end or may be periodically sent to the interfered-with end by means of broadcasting or signaling by the base station or the relay station to which the interfered-with end belongs. The preset interference threshold is set according to whether a selected algorithm is ratio calculation or difference calculation. Interference thresholds of different interfered-with ends at a same moment may be different, and interference thresholds of a same interfered-with end at different moments may also be different.

The calculation result of the foregoing calculation is used for generating the interfering source information. A format of the interfering source information may include a time-frequency resource section and a corresponding interference identifier, and the interference identifier may be represented by a bit; for example, each time-frequency resource section corresponds to an interference identifier of 1 bit, the interference identifier "0" indicates that no interference is caused to the interfered-with end, and "1" indicates that interference is caused to the interfered-with end.

In this embodiment, an interference suppression terminal receives a first reference signal or a first reference signal group and a second reference signal or a second reference signal group, which are respectively sent, on a specified time-frequency resource, by a base station and an interfering source, determines whether the specified time-frequency resource causes interference to the interfered-with end by comparing signal strength of the first reference signal or the first reference signal group with strength of the second reference signal or the second reference signal group, and if the specified time-frequency resource causes interference to the interfered-with end, instructs the base station or a relay station to which the interfered-with end belongs to coordinate during scheduling, so as to avoid arranging uplink and downlink signals of the interfered-with end and the interfering source on a same time-frequency resource for communication. According to the present invention, mutual interference between uplink and downlink signals of terminals located in a same cell or different cells can be suppressed.

Figure 15:
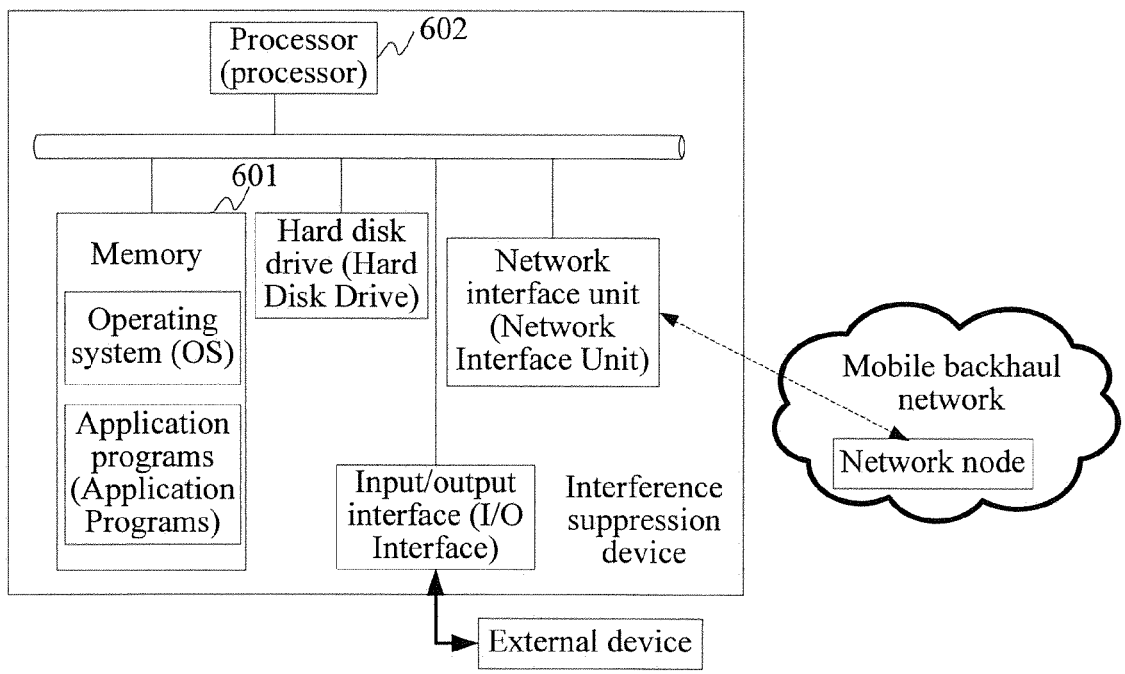
FIG. 15 is a structural diagram of an interference suppression device according to an embodiment of the present invention.

Referring to FIG. 15, FIG. 15 is a structural diagram of an interference suppression device according to an embodiment of the present invention. The interference suppression device provided in this embodiment is an interfered-with end, that is, a user terminal or a relay station, and a potential interfering source is a user terminal that is located at a cell border and in a neighboring cell of a cell to which the interfered-with end belongs or another user terminal or relay station in a cell to which the interfered-with end belongs. As shown in FIG. 15, the interference suppression device provided in this embodiment includes a memory 601 and a processor 602, where the memory 601 is configured to store a set of program code, and the processor 602 is configured to invoke the program code stored in the memory 601, to perform steps of:

receiving a first reference signal or a first reference signal group that is sent on a specified time-frequency resource by a base station or a relay station to which the interference suppression device belongs;

receiving a second reference signal or a second reference signal group that is sent on the specified time-frequency resource by a potential interfering source, where the potential interfering source and the interference suppression device belong to a same cell or different cells, and the potential interfering source is an interfering source or a non-interfering source;

generating interfering source information according to signal strength of the first reference signal or the first reference signal group and signal strength of the second reference signal or the second reference signal group, where the interfering source information includes an interference identifier used for indicating whether the potential interfering source sending a reference signal on the specified time-frequency resource causes interference to the interference suppression device, where the second reference signal or the second reference signal group is an uplink reference signal; and sending the interfering source information to the base station or the relay station to which the interference suppression device belongs, and using the interfering source information as reference information when the base station or the relay station to which the interference suppression device belongs schedules a time-frequency resource.

The using the interfering source information as reference information when the base station or the relay station to which the interference suppression device belongs schedules a time-frequency resource may be: when the interference identifier in the interfering source information indicates that the potential interfering source sending the reference signal on the specified time-frequency resource causes interference to the interference suppression device, determining, by the base station or the relay station to which the interference suppression device belongs, that the potential interfering source is an interfering source, or when the interference identifier in the interfering source information indicates that the potential interfering source sending the reference signal on the specified time-frequency resource does not cause interference to the interference suppression device, determining that the potential interfering source is a non-interfering source, and allocating different time-frequency resources to the interference suppression device and the potential interfering source determined as an interfering source.

Optionally, before the processor 602 performs the step of receiving a second reference signal or a second reference signal group that is sent on the specified time-frequency resource by a potential interfering source, the processor is further configured to perform steps of:

receiving a message that is sent by the base station or the relay station to which the interference suppression device belongs and is for receiving, on the specified time-frequency resource, the second reference signal or the second reference signal group, and triggering performing of the step of receiving a second reference signal or a second reference signal group that is sent on the specified time-frequency resource by a potential interfering source.

Optionally, a specific manner in which the processor 602 performs the step of generating interfering source information according to signal strength of the first reference signal or the first reference signal group and signal strength of the second reference signal or the second reference signal group includes:

calculating a difference or a ratio between the signal strength of the first reference signal or the first reference signal group and the signal strength of the second reference signal or the second reference signal group; and when the difference or the ratio is greater than a corresponding interference threshold, generating the interfering source information including the interference identifier used for indicating whether the potential interfering source sending the reference signal on the specified time-frequency resource causes interference to the interference suppression device, and setting the interference identifier corresponding to the specified time-frequency resource to a state of indicating that the specified time-frequency resource causes interference to the interference suppression device.

A specific calculation method may be that:

the processor measures the signal strength, which is represented by P_ue, of the SRS that is sent on the specified time-frequency resource by the potential interfering source;

at the same time or at a previous moment, the processor measures the strength, which is represented by P_enb, of the cell specific RS sent by the base station or the relay station; and the processor calculates a ratio or a difference between P_ue and P_enb, and compares a calculation result with a preset interference threshold, to determine whether a signal of a user causes interference to communication of the interference suppression device. The preset interference threshold may be preset and stored in the memory or may be periodically sent to the processor by means of broadcasting or signaling by the base station or the relay station to which the interference suppression device belongs. The preset interference threshold is set according to whether a selected algorithm is ratio calculation or difference calculation. Interference thresholds of different interference suppression devices at a same moment may be different, and interference thresholds of a same interference suppression device at different moments may also be different.

The calculation result of the foregoing calculation is used for generating the interfering source information. A format of the interfering source information may include a time-frequency resource section and a corresponding interference identifier, and the interference identifier may be represented by a bit; for example, each time-frequency resource section corresponds to an interference identifier of 1 bit, the interference identifier "0" indicates that no interference is caused to the interfered-with end, and "1" indicates that interference is caused to the interfered-with end.

The interference threshold is preset and stored in the interfered-with end or is periodically sent to the interfered-with end by means of broadcasting or signaling by the base station or the relay station to which the interfered-with end belongs.

In this embodiment, an interference suppression terminal receives a first reference signal or a first reference signal group and a second reference signal or a second reference signal group, which are respectively sent, on a specified time-frequency resource, by a base station and an interfering source, determines whether the specified time-frequency resource causes interference to the interfered-with end by comparing signal strength of the first reference signal or the first reference signal group with strength of the second reference signal or the second reference signal group, and if the specified time-frequency resource causes interference to the interfered-with end, instructs the base station or a relay station to which the interfered-with end belongs to coordinate during scheduling, so as to avoid arranging uplink and downlink signals of the interfered-with end and the interfering source on a same time-frequency resource for communication. According to the present invention, mutual interference between uplink and downlink signals of terminals located in a same cell or different cells can be suppressed.

An embodiment of the present invention further provides an interference suppression system, including a first interference suppression device, a potential interfering source, and a second interference suppression device, where the first interference suppression device is a base station or a relay station, the second interference suppression device is an interfered-with end, for example, a user terminal or a relay station, and the potential interfering source and the second interference suppression device belong to a same cell or different cells, where the first interference suppression device is configured to send, on a specified time-frequency resource, a first reference signal or a first reference signal group to the second interference suppression device;

the potential interfering source is configured to send, on the specified time-frequency resource, a second reference signal or a second reference signal group;

the second interference suppression device is configured to generate interfering source information according to signal strength of the first reference signal or the first reference signal group and signal strength of the second reference signal or the second reference signal group, and send the interfering source information to the first base station, where the interfering source information includes an interference identifier used for indicating whether the potential interfering source sending a reference signal on the specified time-frequency resource causes interference to the second interference suppression device; and the first interference suppression device is configured to: when the interference identifier in the interfering source information indicates that the potential interfering source sending the reference signal on the specified time-frequency resource causes interference to the second interference suppression device, determine that the potential interfering source is an interfering source, or when the interference identifier in the interfering source information indicates that the potential interfering source sending the reference signal on the specified time-frequency resource does not cause interference to the second interference suppression device, determine that the potential interfering source is a non-interfering source, and allocate different time-frequency resources to the second interference suppression device and the potential interfering source determined as an interfering source.

Optionally, the first interference suppression device is further configured to: instruct the second interference suppression device to measure the signal strength of the first reference signal or the first reference signal group and the signal strength of the second reference signal or the second reference signal group.

Optionally, if the second interference suppression device and the potential interfering source belong to a same cell, the first interference suppression device is further configured to:

instruct the potential interfering source to send, on the specified time-frequency resource, the second reference signal or the second reference signal group; and instruct the second interference suppression device to receive, on the specified time-frequency resource, the second reference signal or the second reference signal group.

Optionally, the second interference suppression device and the interfering source belong to different cells, the interference suppression system provided in this embodiment further includes a third interference suppression device, where the third interference suppression device is a base station or a relay station in a cell to which the potential interfering source belongs, and the third interference suppression device is configured to:

instruct the potential interfering source to send, on the specified time-frequency resource, the second reference signal or the second reference signal group; and send information about the specified time-frequency resource to the first interference suppression device.

Optionally, the first interference suppression device is further configured to: receive the information that is about the specified time-frequency resource and sent by the third interference suppression device; and instruct the second interference suppression device to receive, on the specified time-frequency resource sent by the third interference suppression device, the second reference signal or the second reference signal group.

In this embodiment, an interfered-with end receives a first reference signal or a first reference signal group and a second reference signal or a second reference signal group, which are respectively sent, on a specified time-frequency resource, by a first base station and an interfering source, determines whether the specified time-frequency resource causes interference to the interfered-with end by comparing signal strength of the first reference signal or the first reference signal group with strength of the second reference signal or the second reference signal group, and if the specified time-frequency resource causes interference to the interfered-with end, instructs the first base station of the interfered-with end to coordinate during scheduling, so as to avoid arranging uplink and downlink signals of the interfered-with end and the interfering source on a same time-frequency resource for communication. According to the present invention, mutual interference between uplink and downlink signals located in a same cell or different cells can be suppressed.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. An interference suppression method, comprising:
   receiving, by an interfered-with end, a first reference signal or a first reference signal group sent on a time-frequency resource by a base station or a relay station to which the interfered-with end belongs, wherein the interfered-with end is a user terminal or a relay station;
   receiving, by the interfered-with end, a second reference signal or a second reference signal group sent on the time-frequency resource by a potential interfering source;
   calculating a ratio between a signal strength of the first reference signal or the first reference signal group and a signal strength of the second reference signal or the second reference signal group;
   generating, by the interfered-with end, interfering source information according to the signal strength of the first reference signal or the first reference signal group and the signal strength of the second reference signal or the second reference signal group, wherein the interfering source information comprises an interference identifier used for indicating whether the potential interfering source causes interference to the interfered-with end;

setting the interference identifier to a state of indicating that the potential interfering source causes interference to the interfered-with end when the ratio is greater than an interference threshold, and otherwise setting the interference identifier to a state of indicating that the potential interfering source does not cause interference to the interfered-with end; and sending the interfering source information to the base station or the relay station to which the interfered-with end belongs.

2. The method according to claim 1, wherein before receiving the second reference signal or the second reference signal group sent on the time-frequency resource by the potential interfering source, the method further comprises:

receiving a message sent by the base station or the relay station to which the interfered-with end belongs and is for receiving, on the time-frequency resource, the second reference signal or the second reference signal group; and triggering performing of the step of receiving the second reference signal or the second reference signal group sent on the time-frequency resource by the potential interfering source.

3. The method according to claim 1, wherein the interference threshold is preset and stored in the interfered-with end or is periodically sent to the interfered-with end by means of broadcasting or signaling by the base station or the relay station to which the interfered-with end belongs, wherein interference thresholds of different interfered-with ends at a same moment are a same value or different values, and interference thresholds of a same interfered-with end at different moments are a same value or different values.

4. An interference suppression device for use with a base station or a relay station, the interference suppression device comprising a memory and a processor, wherein program code is stored in the memory, and the processor is configured to invoke the program code stored in the memory, to perform the following:

sending, on a time-frequency resource, a first reference signal or a first reference signal group to an interfered-with end belonging to the base station or the relay station;

receiving interfering source information sent by the interfered-with end, wherein the interfering source information comprises an interference identifier used for indicating whether a potential interfering source causes interference to the interfered-with end, the interfering source information is generated by the interfered-with end according to a ratio between signal strength of the first reference signal or the first reference signal group and signal strength of a second reference signal or a second reference signal group sent by the potential interfering source and received on the time-frequency resource by the interfered-with end;

determining whether the potential interfering source is an interfering source, wherein when the interference identifier in the interfering source information indicates that the potential interfering source causes interference to the interfered-with end, the potential interfering source is the interfering source, wherein the interference identifier indicates that the potential interfering source causes interference to the interfered-with end when the ratio is greater than an interference threshold, and the interference identifier indicates that the potential interfering source does not cause interference to the interfered-with end when the ratio is less than the interference threshold; and allocating different time-frequency resources to the interfered-with end and the potential interfering source when the potential interfering source is determined as the interfering source.

5. The device according to claim 4, wherein the processor is further configured to invoke the program code stored in the memory to perform the following:

instructing the interfered-with end to measure the signal strength of the first reference signal or the first reference signal group and the signal strength of the second reference signal or the second reference signal group; and instructing the interfered-with end to send the interfering source information.

6. The device according to claim 4, wherein when the interfered-with end and the interfering source belong to a same cell, the processor is further configured to invoke the program code stored in the memory to perform the following:

instructing the potential interfering source to send, on the time-frequency resource, the second reference signal or the second reference signal group; and instructing the interfered-with end to receive, on the time-frequency resource, the second reference signal or the second reference signal group.

7. The device according to claim 4, wherein when the interfered-with end and the potential interfering source belong to different cells, the processor is further configured to invoke the program code stored in the memory to perform the following:

receiving information that is about the time-frequency resource and sent by a base station or a relay station to which the potential interfering source belongs; and instructing the interfered-with end to receive, on the time-frequency resource whose information is sent by the base station or the relay station to which the potential interfering source belongs, the second reference signal or the second reference signal group, wherein the second reference signal or the second reference signal group is sent by the potential interfering source after the potential interfering source receives a message sent by the base station or the relay station to which the potential interfering source belongs and that instructs the potential interfering source to send, on the time-frequency resource, the second reference signal or the second reference signal group.

8. The device according to claim 7, wherein allocating different time-frequency resources to the interfered-with end and the potential interfering source further comprises:

coordinating with the base station or the relay station to which the potential interfering source belongs, to allocate different time-frequency resources to the interfered-with end and the potential interfering source.

9. The device according to claim 5, wherein instructing the interfered-with end to measure the signal strength of the first reference signal or the first reference signal group and the signal strength of the second reference signal or the second reference signal group further comprises:

instructing the interfered-with end to measure, in each preset period, the signal strength of the first reference signal or the first reference signal group and the signal strength of the second reference signal or the second reference signal group sent by the potential interfering source.

10. The device according to claim 5, wherein of instructing the interfered-with end to measure the signal strength of the first reference signal or the first reference signal group and the signal strength of the second reference signal or the second reference signal group further comprises:
instructing the interfered-with end to measure, in each first preset period, the signal strength of the first reference signal or the first reference signal group and the signal strength of the second reference signal or the second reference signal group sent by the potential interfering source determined as an interfering source and measure, in each second preset period, the signal strength of the first reference signal or the first reference signal group and the signal strength of the second reference signal or the second reference signal group sent by the potential interfering source determined as a non-interfering source, wherein the second preset period is greater than the first preset period, wherein when the interference identifier in the interfering source information indicates that the potential interfering source does not cause interference to the interfered-with end, the potential interfering source is the non-interfering source.

11. The device according to claim 5, wherein instructing the interfered-with end to measure the signal strength of the first reference signal or the first reference signal group and the signal strength of the second reference signal or the second reference signal group further comprises:
when it is determined that a data transmission error rate of the interfered-with end exceeds a preset threshold, instructing the interfered-with end to measure the signal strength of the first reference signal or the first reference signal group and the signal strength of the second reference signal or the second reference signal group sent by the potential interfering source.

12. The device according to claim 5, wherein instructing the interfered-with end to send the interfering source information further comprises:
instructing, by using independent signaling, the interfered-with end to send the interfering source information.

13. The device according to claim 5, wherein instructing the interfered-with end to send the interfering source information comprises:
instructing the interfered-with end to send, after a preset time period after the signal strength of the first reference signal or the first reference signal group and the signal strength of the second reference signal or the second reference signal group are measured, the interfering source information.

14. The device according to claim 13, wherein the processor is further configured to invoke the program code stored in the memory to perform the following:
instructing the interfered-with end to send a time-frequency resource occupied by the interfering source information and a transmission format.

15. An interference suppression device for use with an interfered-with end which is a user terminal or a relay station, the interference suppression device comprising a memory and a processor, wherein program code is stored in the memory, and the processor is configured to invoke the program code stored in the memory, to perform the following:
receiving a first reference signal or a first reference signal group sent on a time-frequency resource by a base station or a relay station to which the interference suppression device belongs;
receiving a second reference signal or a second reference signal group sent on the time-frequency resource by a potential interfering source;
calculating a ratio between a signal strength of the first reference signal or the first reference signal group and a signal strength of the second reference signal or the second reference signal group;
generating interfering source information according to the signal strength of the first reference signal or the first reference signal group and the signal strength of the second reference signal or the second reference signal group, wherein the interfering source information comprises an interference identifier used for indicating whether the potential interfering source causes interference to the interfered-with end;
setting the interference identifier to a state of indicating that the potential interfering source causes interference to the interfered-with end when the ratio is greater than an interference threshold, and otherwise setting the interference identifier to a state of indicating that the potential interfering source does not cause interference to the interfered-with end; and
sending the interfering source information to the base station or the relay station to which the interfered-with end belongs.

16. The device according to claim 15, wherein the processor is further configured to invoke the program code stored in the memory to perform the following:
receiving a message sent by the base station or the relay station to which the interfered-with end belongs and is for receiving, on the time-frequency resource, the second reference signal or the second reference signal group; and
triggering performing of the step of receiving a second reference signal or a second reference signal group that is sent on the time-frequency resource by a potential interfering source.

17. The device according to claim 15, wherein the interference threshold is preset and stored in the memory or is periodically sent to the interfered-with end by means of broadcasting or signaling by the base station or the relay station to which the interfered-with end belongs.

* * * * *